US012703508B2

(12) United States Patent
Ford et al.

(10) Patent No.: US 12,703,508 B2
(45) Date of Patent: Aug. 11, 2026

(54) LOW-PROFILE LIGHT-WEIGHT CARGO LOADERS FOR USE ON CARGO AIRCRAFT

(71) Applicant: KNIGHT AEROSPACE, San Antonio, TX (US)

(72) Inventors: Jeff Ford, San Antonio, TX (US); David Light, San Antonio, TX (US); Luis Garcia, San Antonio, TX (US); August Padalecki, San Antonio, TX (US); Tye Thompson, San Antonio, TX (US); Ambrosio Garza, San Antonio, TX (US)

(73) Assignee: KNIGHT AEROSPACE, San Antonio, TX (US)

( * ) Notice: Subject to any disclaimer, the term of this patent is extended or adjusted under 35 U.S.C. 154(b) by 392 days.

(21) Appl. No.: 18/453,992

(22) Filed: Aug. 22, 2023

(65) Prior Publication Data

US 2024/0059429 A1 Feb. 22, 2024

Related U.S. Application Data

(60) Provisional application No. 63/499,947, filed on May 3, 2023, provisional application No. 63/399,883, filed on Aug. 22, 2022.

(51) Int. Cl.

| | |
|---|---|
| ***B64F 1/32*** | (2006.01) |
| ***B66F 9/065*** | (2006.01) |
| ***B66F 9/075*** | (2006.01) |

(52) U.S. Cl.

CPC .............. *B64F 1/322* (2020.01); *B66F 9/065* (2013.01); *B66F 9/07513* (2013.01)

(58) Field of Classification Search

CPC .......... B64F 1/322; B66F 9/065; B66F 7/065; B66F 7/08; B66F 7/0625

See application file for complete search history.

(56) References Cited

U.S. PATENT DOCUMENTS 3,164,274 A * 1/1965 Herrmann ............... C07B 39/00 414/659
3,610,580 A * 10/1971 Johnstone ............. B62B 3/0618 254/5 C (Continued)

FOREIGN PATENT DOCUMENTS

AU 2021221689 A1 3/2023
CN 107097971 B 8/2019

(Continued)

OTHER PUBLICATIONS

PCT/US2023/030873 Search Report and Written Opinion dated Nov. 2, 2023, 9 pgs.

*Primary Examiner* — Kaitlin S Joerger
(74) *Attorney, Agent, or Firm* — Myers Wolin, LLC

(57) ABSTRACT

Embodiments are directed to low-profile, low-weight cargo loader, including a pair of cargo loaders including a first cargo loader arranged in tandem with a second cargo loader in a first orientation. According to an embodiment, each of the first cargo loader and the second cargo loader includes a chassis, a scissor lift, a platform, a front driving system, and a rear driving system. According to an embodiment, the second cargo loader is configured to be stacked on the first cargo loader in a second orientation.

15 Claims, 21 Drawing Sheets

(56) References Cited

U.S. PATENT DOCUMENTS

| | | | | | |
|---|---|---|---|---|---|
| 3,666,127 | A | * | 5/1972 | Guyaux | B66F 7/0658 14/71.1 |
| 3,885,685 | A | | 5/1975 | Montgomery et al. | |
| 4,077,532 | A | | 3/1978 | Bryan | |
| 4,130,178 | A | * | 12/1978 | Smith, Jr. | B66F 7/08 182/69.5 |
| 4,165,810 | A | | 8/1979 | Young | |
| 4,312,619 | A | * | 1/1982 | Anderson | B66F 7/08 414/351 |
| 4,541,768 | A | * | 9/1985 | Walker | B64F 1/322 414/535 |
| 4,682,750 | A | * | 7/1987 | Rudolph | B66F 7/0625 254/9 C |
| 4,764,075 | A | * | 8/1988 | Cox | B65G 1/07 211/59.3 |
| 4,978,272 | A | * | 12/1990 | Leon | B66F 7/0658 193/35 MD |
| 5,378,105 | A | | 1/1995 | Palko | |
| 5,630,694 | A | * | 5/1997 | Ihara | B66F 7/065 414/373 |
| 5,876,018 | A | | 3/1999 | Crisp et al. | |
| 8,425,174 | B2 | | 4/2013 | Quirion | |
| 10,289,117 | B1 | | 5/2019 | Zou et al. | |
| 10,773,630 | B1 | * | 9/2020 | Thompson | B60R 9/042 |
| 2008/0118337 | A1 | | 5/2008 | Vestergaard | |
| 2013/0213913 | A1 | | 8/2013 | Kohlgruber | |
| 2016/0060084 | A1 | * | 3/2016 | Baudermann | B66F 9/07563 414/347 |
| 2017/0182927 | A1 | * | 6/2017 | Brewster | B60P 7/083 |
| 2018/0072211 | A1 | * | 3/2018 | Kato | B60P 1/02 |
| 2020/0307793 | A1 | | 10/2020 | Hoffmann | |
| 2022/0411060 | A1 | | 12/2022 | Honea et al. | |
| 2024/0217570 | A1 | * | 7/2024 | Mogensen | B62B 3/005 |

FOREIGN PATENT DOCUMENTS

| | | | |
|---|---|---|---|
| CN | 217022628 | U | 7/2022 |
| DE | 20221410 | U1 | 11/2005 |
| EP | 0644113 | B1 | 10/1997 |
| RU | 125160 | U8 | 8/2013 |
| RU | 2660198 | C1 | 7/2018 |

* cited by examiner

900

LOW-PROFILE LIGHT-WEIGHT CARGO LOADERS FOR USE ON CARGO AIRCRAFT

CROSS REFERENCE TO RELATED APPLICATIONS

This application is related to, and claims priority to, U.S. Provisional Patent Application Ser. No. 63/499,947, filed on May 3, 2023, which claims priority to U.S. Provisional Patent Application Ser. No. 63/399,883, filed on Aug. 22, 2022, the entire disclosures of which are incorporated by reference herein.

TECHNICAL FIELD

Embodiments generally relate to low-profile, low-weight mobile cargo loaders for loading and unloading cargo on and off a cargo handling system of a cargo aircraft. More particularly, various embodiments are directed to a stackable tandem pair of low-profile, low-weight cargo loaders for loading and unloading cargo on and off a cargo handling system of a cargo aircraft, for example, a C130 or C-17 aircraft.

BACKGROUND

Commercial and military transport aircraft are typically designed to carry a given load of cargo, passengers, or a combination thereof (hereinafter referred to as "cargo"). The aircraft employs a cargo handling system to quickly and efficiently load, unload, and secure the cargo within the aircraft. Cargo may be transported on one or more pallets, such as an HCU-6/E or an 463L Master Pallet, or other standardized pallet for transporting military air cargo.

Conventional cargo loaders have been developed, which use a hydraulic scissor lift configuration for transporting cargo to and from the cargo aircraft. These conventional cargo loaders, which may include one or more cargo loaders, depending on the sizes of the cargo to be transported, can be stored in the cargo aircraft and transported with the cargo. In these configurations, the cargo loaders consume space on the cargo aircraft, and thus may require an additional aircraft to transport the cargo loaders themselves.

Thus, it would be desirable to provide a stackable set of low-profile, low-weight cargo loaders that, when unfurled from a stacked orientation, each low-profile, low-weight cargo loader can be independently deployed to a location to either unload cargo transported by the cargo aircraft or retrieve cargo for loading onto the cargo aircraft. Upon completing these tasks, the individual low-profile, low-weight cargo loaders can then be furled into a stacked orientation and stowed on the cargo aircraft (i.e., effectively functioning as a fully automated "swarm" of cargo loaders).

SUMMARY

Embodiments are directed to low-profile, low-weight cargo loader, including a pair of cargo loaders including a first cargo loader arranged in tandem with a second cargo loader in a first orientation. According to an embodiment, each of the first cargo loader and the second cargo loader includes a chassis, a scissor lift, a platform, a front driving system, and a rear driving system. According to an embodiment, the second cargo loader is configured to be stacked on the first cargo loader in a second orientation.

According to an embodiment, each of the first cargo loader and the second cargo loader has a low-profile height of 24-25 inches.

According to an embodiment, each of the first cargo loader and the second cargo loader weighs 5,000 pounds and is configured to carry a cargo load of 11,000 pounds.

According to an embodiment, the first cargo loader is connected in tandem with the second cargo loader in the first orientation using a non-pivot-type hitch.

According to an embodiment, in the first orientation, the first cargo loader is arranged in an opposing orientation/direction with that of the second cargo loader, such that the front driving system of the first cargo loader and the front driving system of the second cargo loader are positioned on opposing ends of the tandem pair of cargo loaders.

According to an embodiment, in the first orientation, the rear driving system of the first cargo loader and the rear driving system of the second cargo loader are positioned adjacent to one another on the tandem pair of cargo loaders.

According to an embodiment, the front driving system of the first cargo loader includes a first pair of front wheels and the front driving system of the second cargo loader includes a second pair of front wheels, the rear driving system of the first cargo loader comprises a first pair of rear wheels and the rear driving system of the second cargo loader comprises a second pair of rear wheels, and each of the front driving systems of the first and second cargo systems is configured to steer the first pair of front wheels and the second pair of front wheels in opposite directions to turn the low-profile, low-weight cargo loader.

According to an embodiment, the first pair of rear wheels and the second pair of rear wheels are non-steering, freely spinning wheels.

According to an embodiment, each of the rear driving systems of the first cargo loader and the second cargo loader further comprises a pair of suspension brackets, wherein the suspension brackets are configured to secure the pair of rear driving wheels to the chassis of the first cargo loader and the second cargo loader, respectively.

According to an embodiment, in the first orientation, each of the scissor lifts of the first cargo loader and the second cargo loader are configured to lower and raise a respective platform either independently of one another or in unison, and, when lowered or raised in unison, are configured to be leveled with one another to move cargo onto the platforms of the first and second cargo loaders, thereby moving as a single unit to deliver the cargo.

According to an embodiment, each platform comprises a set of rollers configured to roll in an X and Y direction so that cargo can be unloaded off and loaded on any side of the platform.

According to an embodiment, each platform comprises a pair of guide rails positioned on opposite sides of the platform, the pair of guide rails configured to secure a pallet to the platform and further configured to guide a set of wheels of the second cargo loader onto a top surface of the platform of the first cargo loader when the second cargo loader is stacked on the first cargo loader in the second orientation.

According to an embodiment, each chassis of the first cargo loader and the second cargo loader comprises a winged support configured to support a bottom surface of the platform of the first cargo loader and the second cargo loader and cargo carried on the platform of the first cargo loader and the second cargo loader.

According to an embodiment, the low-profile, low-weight cargo loader further includes a pair of ramps configured to attach to the rear of the first cargo loader, wherein the second cargo loader is configured to roll up the pair of ramps to stack the second cargo loader on the first cargo loader.

According to an embodiment, the low-profile, low-weight cargo loader further includes a plurality of tie-down ratcheting turnbuckles configured to secure the first cargo loader to the second cargo loader, in the second orientation.

According to another embodiment, there is provided a method for furling a pair of low-profile, low weight cargo loaders. The method includes the steps of mechanically and electronically disconnecting the pair of low-profile, low weight cargo loaders arranged in tandem. The pair of low-profile, low weight cargo loaders includes a first cargo loader arranged in tandem with a second cargo loader in an unfurled orientation, wherein each of the first cargo loader and the second cargo loader comprises a chassis, a scissor lift, a platform, a front driving system, and a rear driving system. The method further includes driving, using the front driving system of the second cargo loader, the second cargo loader away from the first cargo loader and deploying a pair of ramps by connecting the pair of ramps to the rear of the first cargo loader, driving, using the front driving system of the second cargo loader, the second cargo loader up the ramps onto the first cargo loader guided by guide rails arranged on opposite sides of the platform of the first cargo loader, and driving, using the front driving system of the first cargo loader, the first cargo loader and the furled second cargo loader onto a cargo aircraft.

BRIEF DESCRIPTION OF DRAWINGS

The embodiments disclosed here will be understood by the following detailed description, along with the accompanying drawings. The embodiments shown in the figures only illustrate several embodiments of the disclosure. The disclosure admits of other embodiments not shown in the figures and is not limited to the content of the illustrations.

FIG. 11A illustrates an attached tandem pair of low-profile, low-weight cargo loaders, FIG. 11B illustrates the detachment of the tandem pair of low-profile, low-weight cargo loaders, FIG. 11C illustrates the deployment of a pair of ramps in preparation for a furling of one low-profile, low-weight cargo loader on top of the other low-profile, low-weight cargo loader, FIG. 11D illustrates a movement of one low-profile, low-weight cargo loader onto a top surface of the other low-profile, low-weight cargo loader, and FIG. 11E illustrates a stacked pair of low-profile, low-weight cargo loaders.

DETAILED DESCRIPTION

Figure 1A:
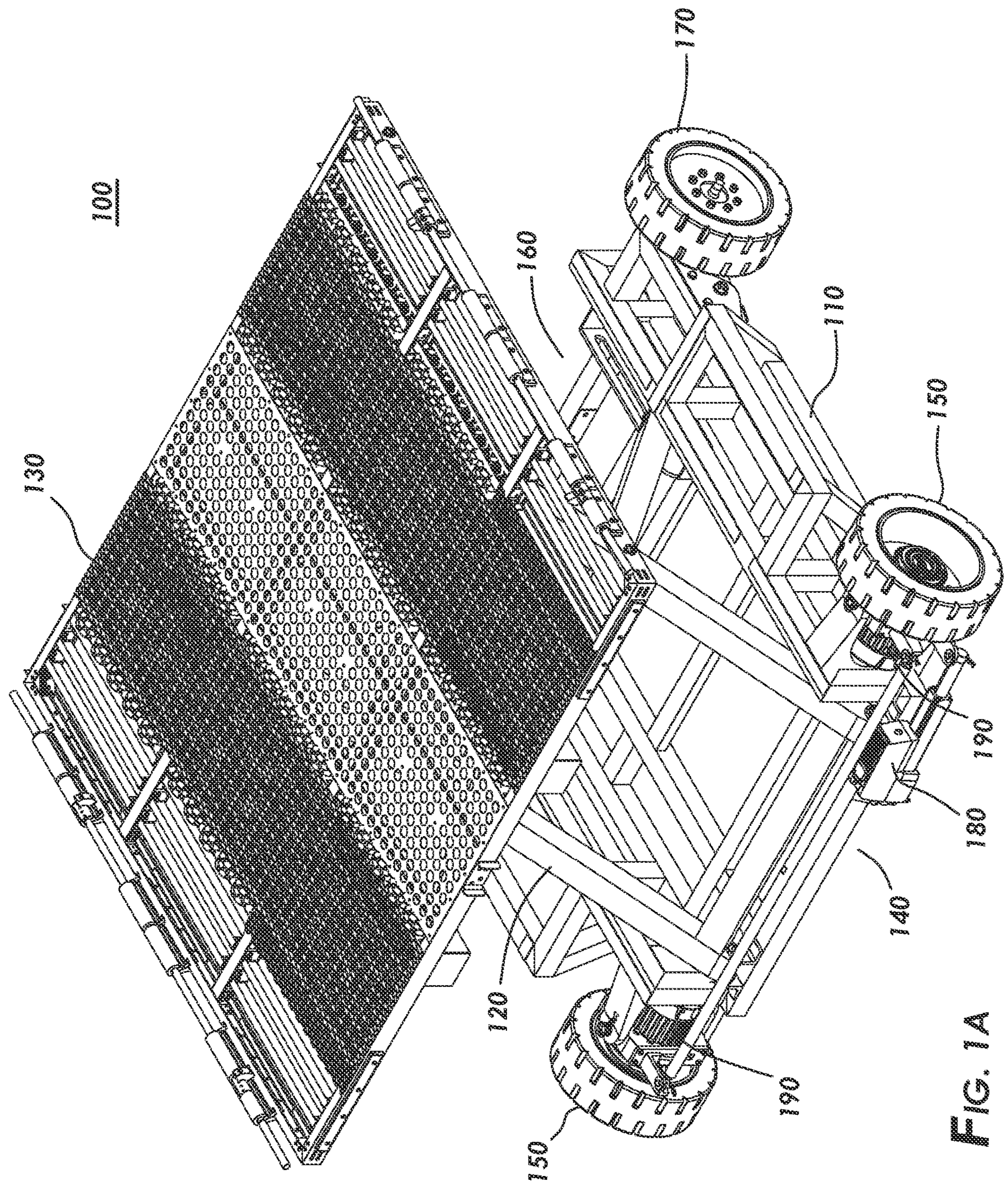
FIG. 1A is a perspective view of a cargo loader, in accordance with an embodiment.

For certain embodiments, many details are provided for a thorough understanding of the various components or steps.

In other instances, well-known processes, devices, and systems are not described in particular detail so that the embodiments are not obscured by detail. Likewise, illustrations of the various embodiments can omit certain features or details so that various embodiments are not obscured.

The drawings provide an illustration of certain embodiments. Other embodiments can be used, and logical changes can be made without departing from the scope of this disclosure. The following detailed description and the embodiments it describes should not be taken in a limiting sense. This disclosure is intended to disclose certain embodiments with the understanding that many other undisclosed changes and modifications can fall within the spirit and scope of the disclosure. The patentable scope is defined by the claims and can include other examples that occur to those skilled in the art. Such other examples are intended to be within the scope of the claims if they have structural elements that do not differ from the literal language of the claims, or if they include equivalent structural elements with insubstantial differences from the literal language of the claims.

The description can use the phrases "in some embodiments," "in various embodiments," "in an embodiment," "in at least one embodiment," or "in embodiments," which can each refer to one or more of the same or different embodiments. Furthermore, the terms "comprising," "including," "having," and the like, and all grammatical variations thereof, as used with respect to embodiments of the present disclosure, are synonymous and are each intended to have an open, non-limiting meaning that does not exclude additional elements or steps. The present invention may suitably comprise, consist or consist essentially of the elements disclosed and may be practiced in the absence of an element not disclosed. For example, it can be recognized by those skilled in the art that certain structural elements can be combined into a single structural element.

The singular forms "a," "an," and "the" include plural referents, unless the context clearly dictates otherwise.

All numbers expressing quantities, percentages or proportions, and other numerical values used in the specification and claims are to be understood as being modified in all instances by the term "about" unless otherwise indicated. The term "about" applies to all numeric values, whether or not explicitly indicated. Values modified by the term "about" can include a deviation of at least ±5% of the given value unless the deviation changes the nature or effect of the value such that it is not operable to achieve its intended purpose.

Ranges can be expressed in this disclosure as from about one particular value and to about another particular value. With these ranges, another embodiment is from the one particular value to the other particular value, along with all combinations within the range. When the range of values is described or referenced in this disclosure, the interval encompasses each intervening value between the upper limit and the lower limit, as well as the upper limit and the lower limit; and includes lesser ranges of the interval subject to any specific exclusion provided.

Unless otherwise defined, all technical and scientific terms used in this specification and the appended claims have the same meanings as commonly understood by one of ordinary skill in the relevant art.

Where a method comprising two or more defined steps is recited or referenced in this disclosure or the appended claims, the defined steps can be carried out in any order or simultaneously except where the context excludes that possibility.

Embodiments of the low-profile, low-weight cargo loaders, as described in detail below, provide a compact, low-profile, low-weight mobile lift system, utilizing a hydraulic scissor lift, for loading and unloading cargo onto and from a cargo aircraft. Various embodiments provide a tandem pair of low-profile, low-weight cargo loaders that operate in concert to enable the loading and unloading of cargo requiring the length and load capacity of two cargo loaders. Various embodiments provide the tandem pair of low-profile, low-weight cargo loaders which are stackable, enabling transport of both of the low-profile, low-weight cargo loaders on a single cargo aircraft, thereby minimizing the need for multiple cargo aircraft.

Figure 1B:
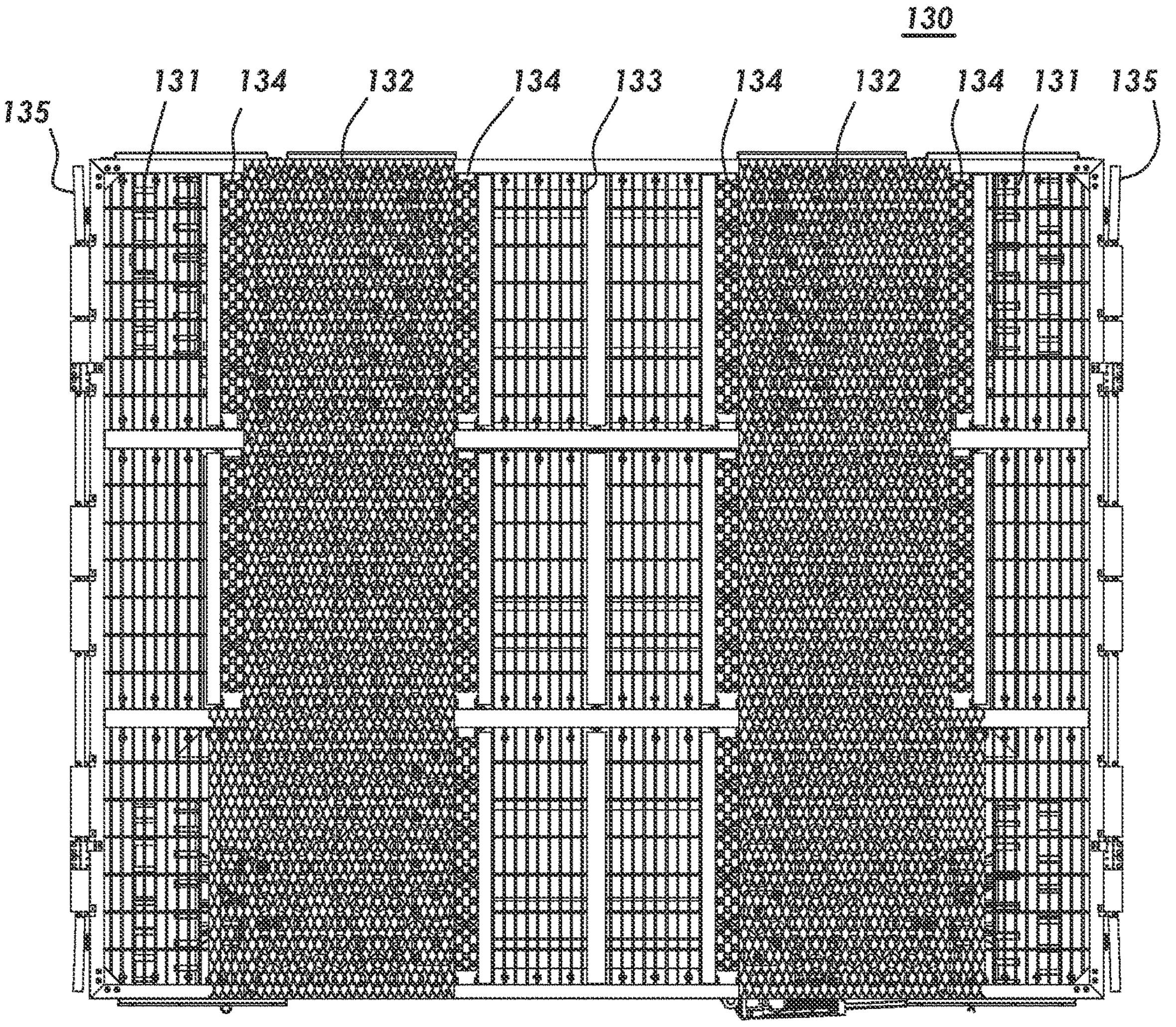
FIG. 1B is a top view of a platform of the cargo loader shown in FIG. 1A, in accordance with an embodiment.
Figure 1C:
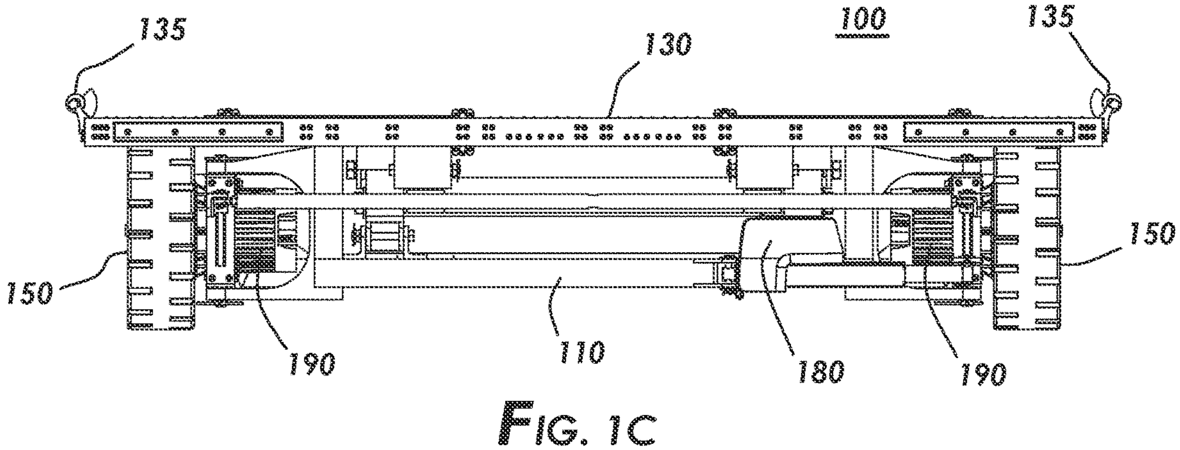
FIG. 1C is a front view of the cargo loader shown in FIG. 1A, in accordance with an embodiment.
Figure 1D:
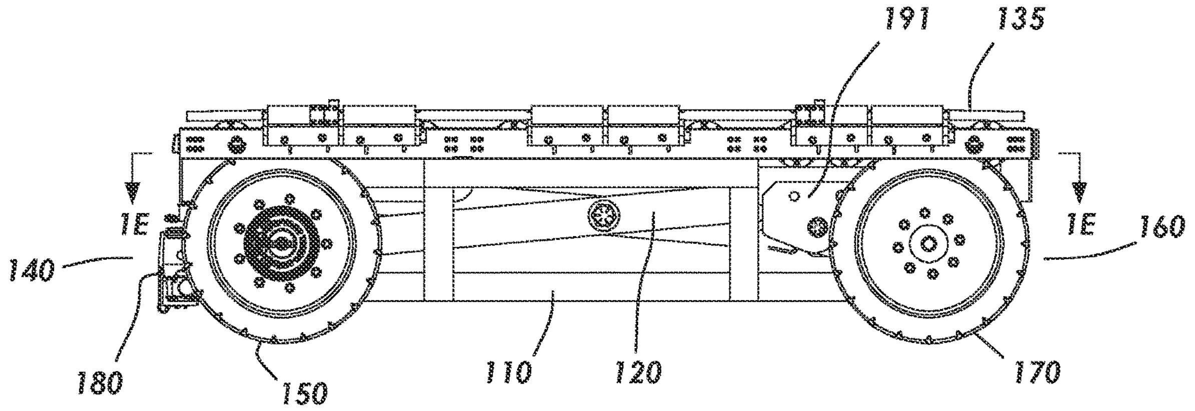
FIG. 1D is a side view of the cargo loader shown in FIG. 1A, in accordance with an embodiment.
Figure 1E:
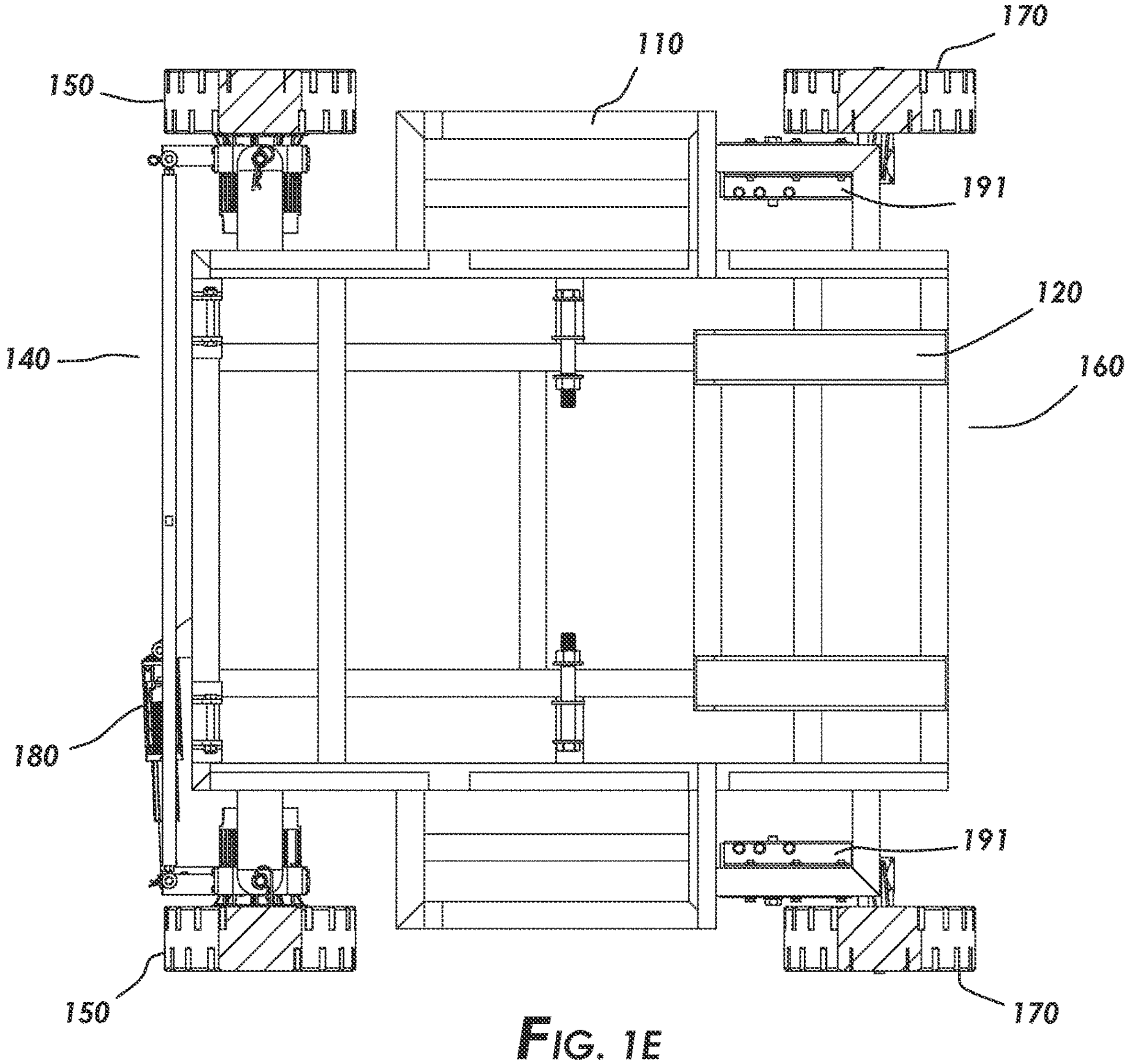
FIG. 1E is a top view of the cargo loader shown in FIG. 1A, in accordance with an embodiment.

FIGS. 1A-1E illustrate a low-profile, low-weight cargo loader, according to various embodiments of the subject application. In particular, FIG. 1A is a perspective view of a cargo loader, in accordance with an embodiment. FIG. 1B is a top view of a platform of the cargo loader shown in FIG. 1A, in accordance with an embodiment. FIG. 1C is a front view of the cargo loader shown in FIG. 1A, in accordance with an embodiment. FIG. 1D is a side view of the cargo loader shown in FIG. 1A, in accordance with an embodiment. FIG. 1E is a top view of the cargo loader shown in FIG. 1A, in accordance with an embodiment.

According to an embodiment, as shown in FIG. 1A, a single low-profile, low-weight cargo loader 100 includes a chassis 110, a scissor lift 120, a platform 130, a front driving system 140, a pair of front wheels 150, a rear driving system 160, and a pair of rear wheels 170. According to an embodiment, the low-profile, low-weight cargo loader 100, when the scissor lift 120 is in a seated (i.e., lowered) position, has a height of between 24-25 inches, enabling a pair of low-profile, low-weight cargo loaders 100 to be stacked on top of one another and stowed within the cargo hold of a cargo aircraft, as will be discussed in more detail below.

According to an embodiment, each of the low-profile, low-weight cargo loaders 100 may include wooden dunnage stacked on a top surface of the loader. Wooden dunnage is utilized by military personnel to support the offloaded 463L pallets received from the cargo aircraft. The dimension for wooden dunnage is typically 4 inches wide×4 inches in height. In some cases, two pieces of wooden dunnage are stacked on one another, providing a stacked height of 8 inches. The length of the wooden dunnage varies, but typically is a length of approximately 8-10 feet.

According to an embodiment, as shown in FIGS. 1A and 1C-1E, the chassis 110 is a rigid, rectangular, open frame member. The chassis 110 may be constructed of aluminum 6061, although other light metals have been considered. The chassis 110 includes various extrusion profiles, including square extrusions with dimensions of 3 inches×3 inches×⅛ inches thick and rectangular extrusions with dimensions of 3 inches×2 inches×⅛ inches thick.

According to an embodiment, the chassis 110 includes a designed wing support, which acts as a structural support for the cargo load supported by the platform 130 when the scissor lift 120 is fully retracted by adding structural gussets to the wings of the chassis 110. These wings on both sides of the chassis 110 also serve as an electrical closet and hydraulic closet for easy maintenance of the low-profile, low-weight cargo loader 100.

According to an embodiment, as further shown in FIGS. 1A, 1D, and 1E, the scissor lift 120 includes two crossed lever arms disposed on opposite sides of the chassis 110, each arm having two crossed and pivotally interconnected arms. Each of the interconnected arms are pivotally connected at distal ends to the chassis 110 and the platform 130, as further shown in FIGS. 7A-7F. The scissor lift 120 includes hydraulic actuators (not shown), which are capable of lifting cargo loads of approximately 11,000 pounds. (i.e., a light-weight cargo loader weighing approximately 5,000 pounds capable of lifting approximately 11,000 pounds of cargo). According to an embodiment, the scissor lift 120 may include electric powered screw drives to provide force to the scissor lift 120, however, these drives are typically too slow for operating the scissor lift 120 and therefore a less desirable option.

The scissor lift 120 may be constructed of aluminum 6061, although other light metals have been considered. The scissor lift 120 includes various extrusion profiles, including square extrusions with dimensions of 4 inches×4 inches×½ inches thick and rectangular extrusions with dimensions of 4 inches×3 inches×½ inches thick.

According to an embodiment, the scissor lift 120 further includes a flow divider and velocity fuses (not shown) operating in concert with the hydraulic actuators to ensure that the opposing interconnected arms operate synchronously, and should any component of the scissor lift 120 fail to operate properly (i.e., a burst hydraulic hose), the scissor lift 120 will maintain hydraulic pressure to prevent the operating interconnected arm from failing and lowering or dropping the cargo load carried on the platform 130, until the inoperative component can be repaired.

According to an embodiment, the platform 130 is a rigid, rectangular, open frame member and is supported on the chassis 110 by the scissor lift 120. The platform 130 may be constructed of aluminum 6061, although other light metals have been considered. The platform 130 includes various extrusion profiles, including dimensions of 3 inches×1.5 inches×0.13 inches×0.2 inches Aluminum Channel 6061-T6 Extruded-8 feet; 3 inches×2.5 inches×0.15 inches Aluminum I-Beam 6061-T6 Extruded-9 ft; 1.25 inches×1.25 inches×0.125 inches Aluminum C-Channel 6061-T6 Extruded-8 ft; and 3 inches×5 inches×0.25 inches Aluminum Rectangle Tube 6061-T6 Extruded-8 ft. These materials and extrusion profiles are typically used on corresponding pallet structures and thus platform 130 is constructed in manner which can withstand flight conditions of 9Gs, when in flight on the cargo aircraft.

According to an embodiment, as shown in FIGS. 1A and 1C-1E, the front driving system 140, which includes the pair of front wheels 150, is a rack-and-pinion steering system including an electric linear steering actuator 180, providing an improved turning radius to the low-profile, low-weight cargo loader 100. According to an embodiment, each of the front wheels 150 is equipped with an emergency braking assembly (not shown), although, an electric drum brake assembly (not shown) included in the rear driving system 160 serves as the primary braking system for each low-profile, low-weight cargo loader 100. The front driving system 140 further includes a pair of electric motors 190. The electric linear steering actuator 180 receives a steering signal from an external controller to set a desired turning position of the front wheels 150. Each front wheel 150 is mechanically connected to and driven by a respective electric motor 190. The pair of electric motors 190 is powered by a battery (not shown), for example, a 48V lithium-ion battery.

According to an embodiment, as shown in FIGS. 1A and 1C-1E, the rear driving system 160, which includes the pair of rear wheels 170, provides a static, free spinning motion to the pair of rear wheels 170. Each of the rear wheels 170 is equipped with an electric drum brake assembly (not shown), which operates in concert with the suspension bracket 191 of the rear driving system 160. Each of the rear wheels 170 is mechanically connected to the chassis 110 using a suspension bracket 191. According to an embodiment, a 0.5 suppression/deflection on a dampener of the suspension bracket 191 is observed.

As shown in FIG. 1B, the platform 130 includes a pair of outer platform plates 131, a pair of inner platform plates 132, a middle platform plate 133, a set of rollers 134, and a pair of removable guide rails 135. The platform 130 has a width of approximately 110 inches and a length of approximately 89.5 inches, enabling it to carry an HCU-6/E or an 463L Master Pallet, or other standardized pallet for transporting military or commercial air cargo. As further shown in FIGS. 1B and 1C, the width of the platform 130 is wider than the extension of the front wheels 150 and the rear wheels 170 from the chassis 110, thereby protecting the front wheels 150 and the rear wheels 170 from damage caused by lateral contact to the low-profile, low-weight cargo loader 100 by an object. According to an embodiment, each of the pair of outer platform plates 131 and the middle platform plate 133 may be constructed of 0.25 inches aluminum sheets to hold the cargo loads on the platform 130 and provide a solid surface on which an operator may walk along the platform 130. According to an embodiment, plates 132 may be constructed of 0.25 inches aluminum sheets and further serve to accept any rolling cargo on the platform 130.

As further shown in FIG. 1B, each of the outer platform plates 131 has a width correlating to a width of the pair of front wheels 150 and a width of the pair of rear wheels 170 of a stacked, low-profile, low-weight cargo loader, such that the front wheels 150 and the rear wheels 170 roll along a top surface of the pair of outer platform plates 131. The set of rollers 134 enable a pallet to roll on and off the platform 130. According to an embodiment, the rollers 134 are omni-directional, which allows movement of the pallet on the platform 130 with ease, as well as free to spin in the X and Y directions. The ability for the rollers 134 to roll in two directions allows cargo to be rolled on and off any side of the platform 130. The guide rails 135 align the pallet as it rolls on and off the platform 130. According to an embodiment, the guide rails 135 can be rotated inwardly toward the platform to engage the lugs of the pallet, thereby securing the pallet to the platform 130.

Figure 2A:
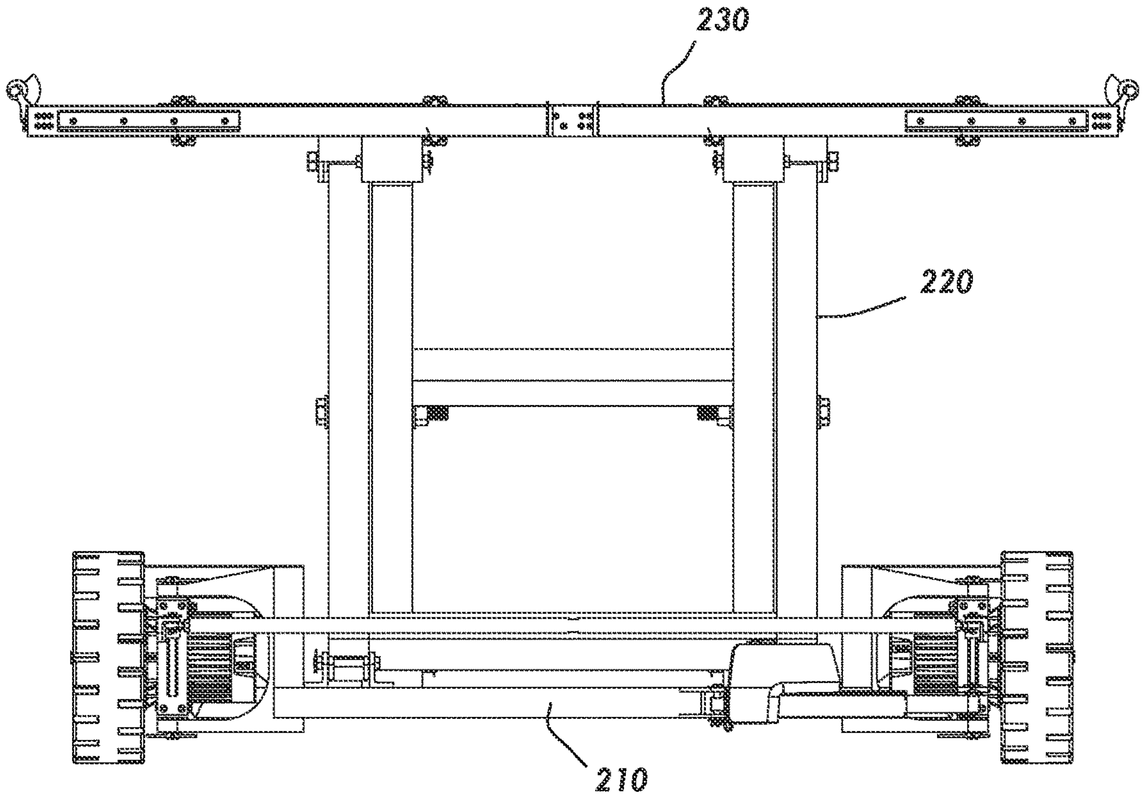
FIG. 2A is a front view of the cargo loader with the platform in a lifted position, in accordance with an embodiment.
Figure 2B:
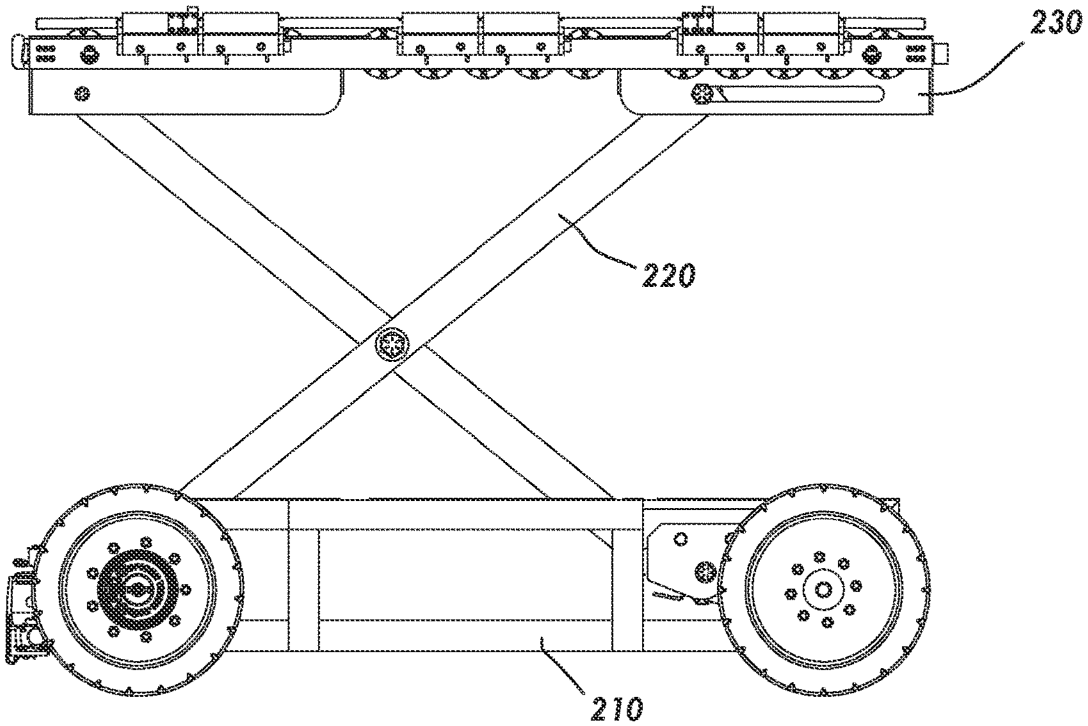
FIG. 2B is a side view of the cargo loader with the platform in a lifted position, in accordance with an embodiment.

FIG. 2A is a front view of the cargo loader with the platform in a lifted position, in accordance with an embodiment. FIG. 2B is a side view of the cargo loader with the platform in a lifted position, in accordance with an embodiment. According to an embodiment, as shown in FIGS. 2A and 2B, the platform 230 can be lifted from a seated position to a lifted position using the scissor lift 220. The elevated platform 230 may be raised to a lifted position approximately the level of the sill of the aircraft cargo door for unloading or loading the cargo on and off the cargo aircraft. For a C-130 aircraft, the ramp height is 42 inches off the ground, and for a C-17 aircraft, the ramp height is 64 inches off the ground, and thus the elevated platform 230 may be raised to a lifted position approximately 65 inches off the ground.

Figure 3A:
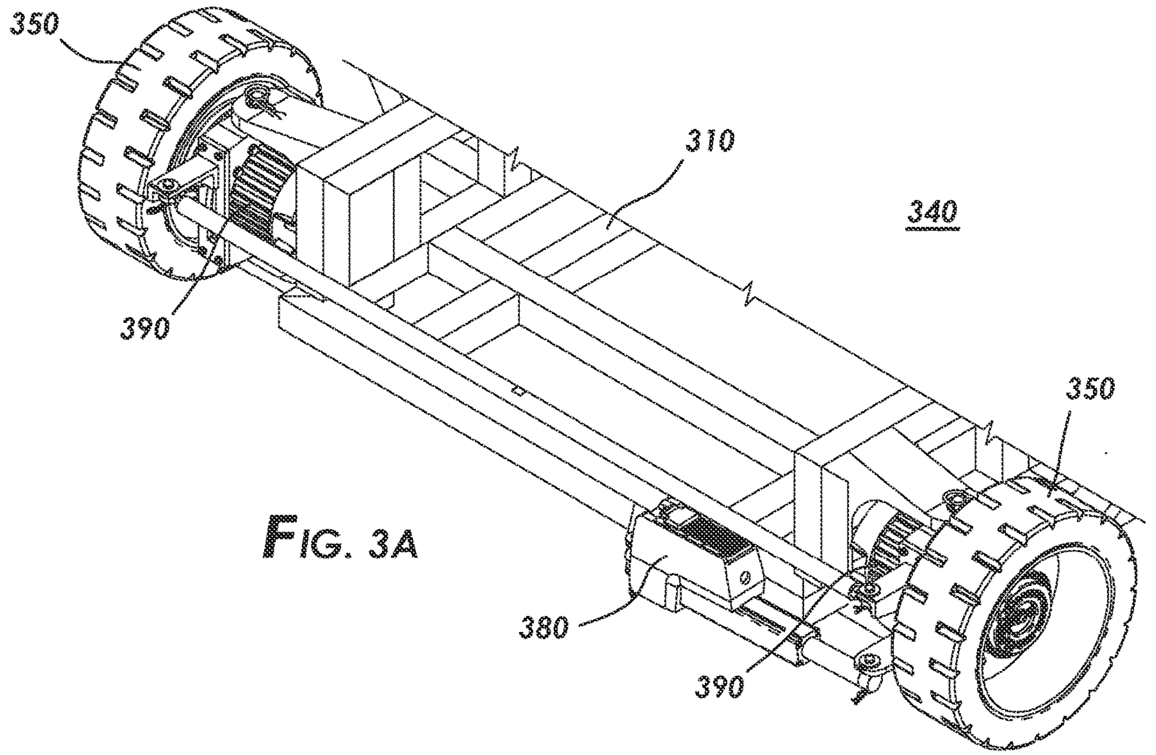
FIG. 3A is a perspective view of a front driving system of the cargo loader, in accordance with an embodiment.
Figure 3B:
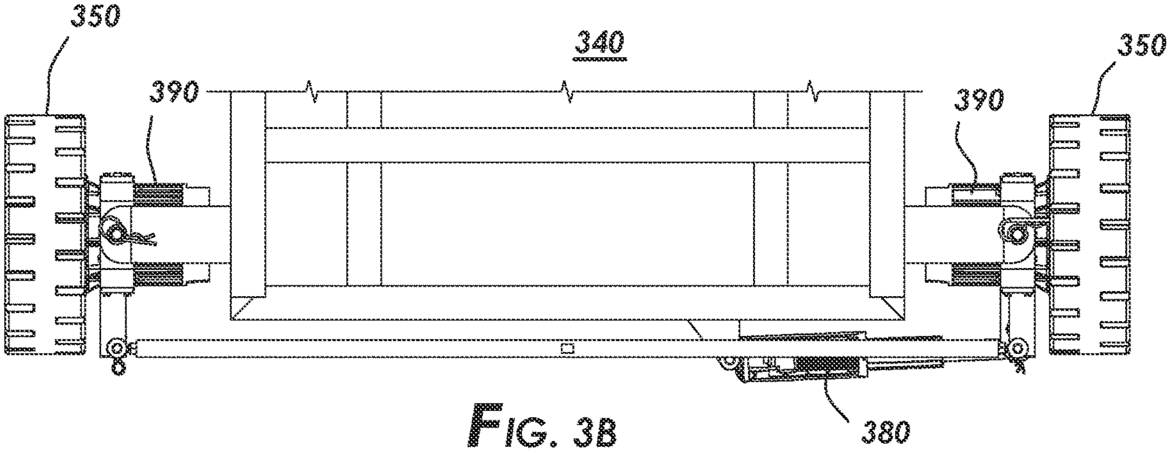
FIG. 3B is a top view of the front driving system of the cargo loader, in accordance with an embodiment.
Figure 3C:
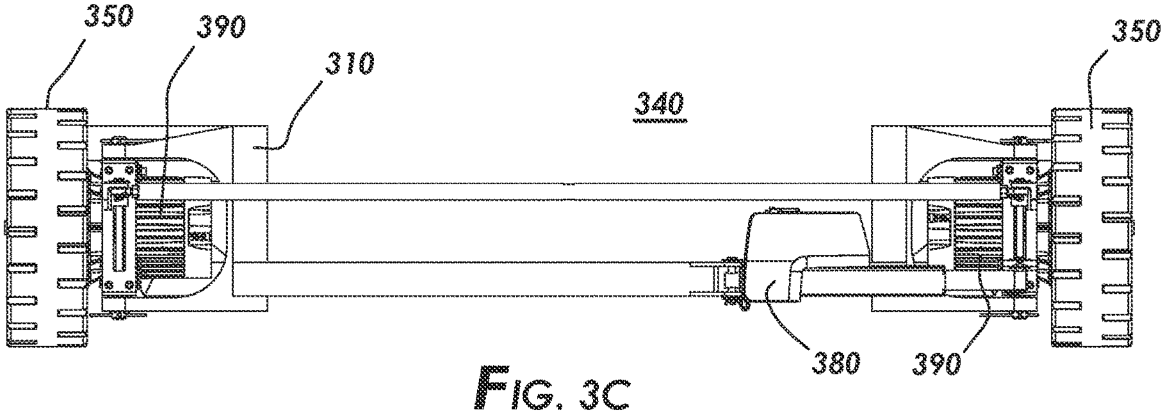
FIG. 3C is a front view of the front driving system of the cargo loader, in accordance with an embodiment.

FIGS. 3A-3E illustrate a front driving system of the low-profile, low-weight cargo loader, according to various embodiments of the subject application. In particular, FIG. 3A is a perspective view of the front driving system of the cargo loader, in accordance with an embodiment. FIG. 3B is a top view of the front driving system of the cargo loader, in accordance with an embodiment. FIG. 3C is a front view of the front driving system of the cargo loader, in accordance with an embodiment.

As shown in FIGS. 3A-3C, the front driving system 340 of the low-profile, low-weight cargo loader 100 is a rack-and-pinion steering system and includes the pair of front wheels 350, the electric linear steering actuator 380, and the pair of electric motors 390. The pair of electric motors 390 is mechanically connected to the external surface of the chassis 310, and a front wheel 350 is mechanically connected to an external surface of a respective electric motor 390. As previously described, the electric linear steering actuator 380 and the electric motors 390 are powered by a single battery (not shown), for example, a 48V lithium-ion battery, enabling the low-profile, low-weight cargo loader to be steered and to travel at a speed of between 3.4 miles/hour to 5.8 miles/hour.

Figure 4:
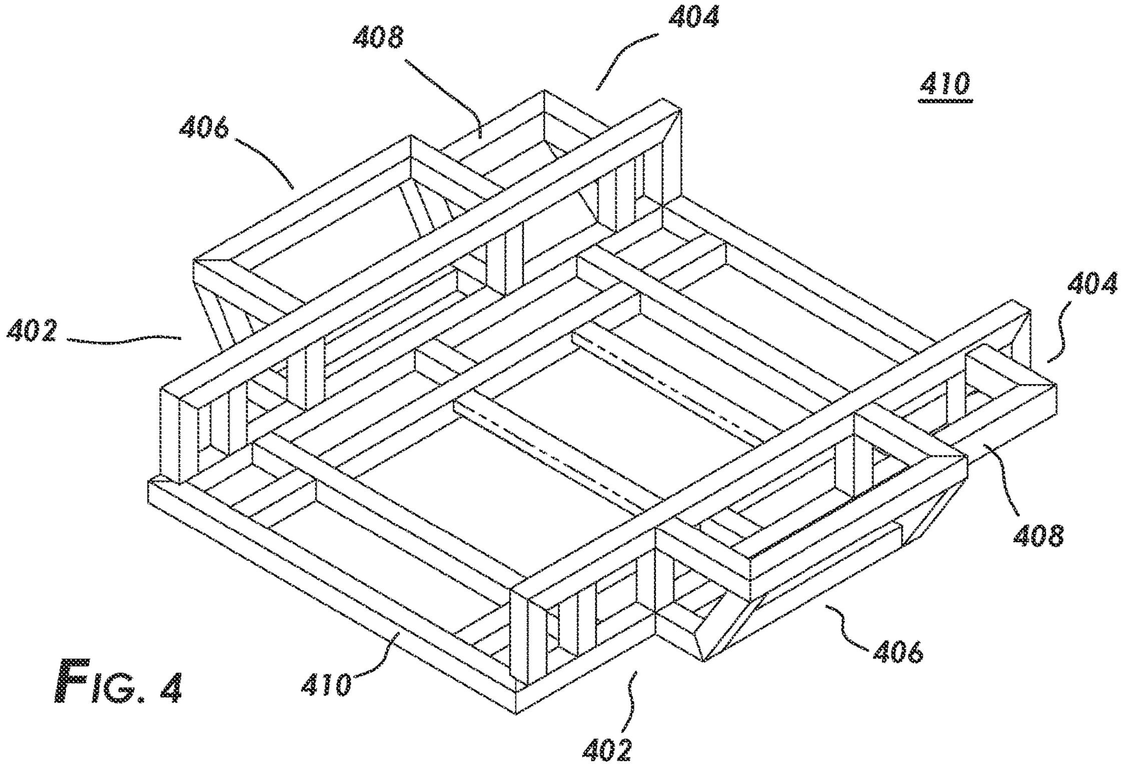
FIG. 4 is a perspective view of a chassis of the cargo loader, in accordance with an embodiment.
Figure 5:
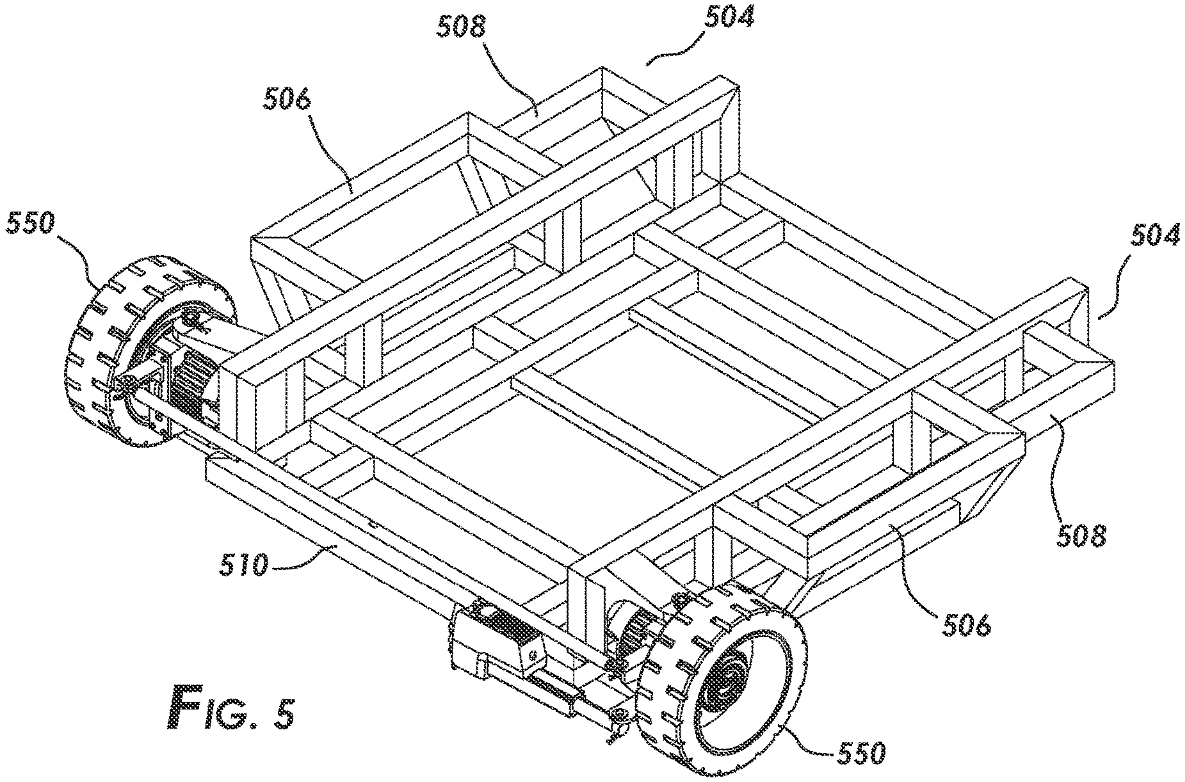
FIG. 5 is a perspective view of the chassis including the front driving system of the cargo loader, in accordance with an embodiment.

FIG. 4 is a perspective view of a chassis of the cargo loader, in accordance with an embodiment. FIG. 5 is a perspective view of the chassis including the front driving system of the cargo loader, in accordance with an embodiment.

As shown in FIGS. 4 and 5, the chassis 410, 510 is a rigid, rectangular, open frame member having a pair of cutouts 402, 502 in the front of the frame member and a pair of cutouts 404, 504 in the rear of the frame member to receive the pair of front wheels 150, 550 and the pair of rear wheels 170, respectively. The chassis 410, 510 further includes a pair of wing supports 406, 506 formed on opposite external sides of the chassis 410, 510 to provide a surface on which the platform 130 may rest above the pair of front wheels 150, 550 and the pair of rear wheels 170, when the platform 130 is in a seated position. According to an embodiment, as further shown in FIGS. 4 and 5, the chassis 410, 510 further includes a pair of connecting fenders 408, 508 formed in cutouts 404, 504 on opposite external sides of the chassis 410, 510 to connect the pair of rear wheels 170 to the chassis 410, 510. As assembled, the pair of front wheels 150, 550 and the pair of rear wheels 170 are aligned in position on lateral sides of the chassis 410, 510 of the low-profile, low-weight cargo loader 100.

Figure 6A:
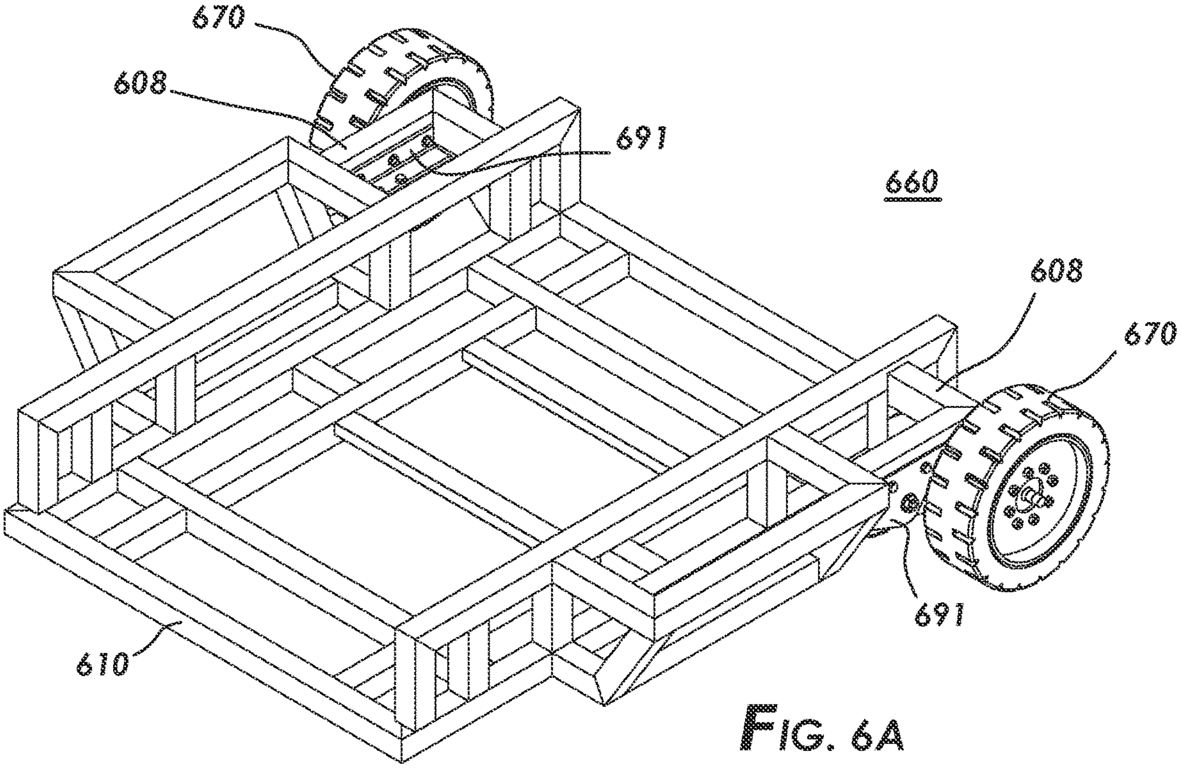
FIG. 6A is a perspective view of the chassis including the rear driving system of the cargo loader, in accordance with an embodiment.
Figure 6B:
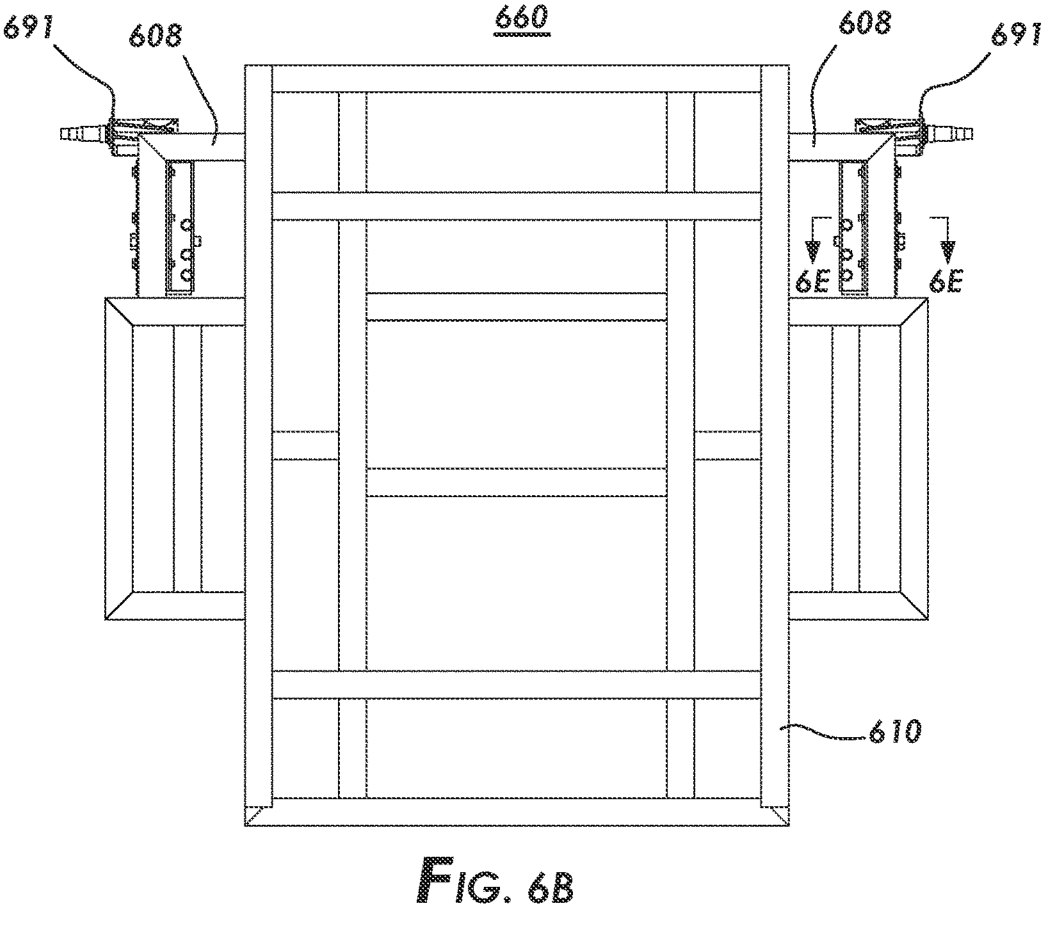
FIG. 6B is a top view of the chassis including the rear driving system with the wheels removed of the cargo loader, in accordance with an embodiment.
Figure 6C:
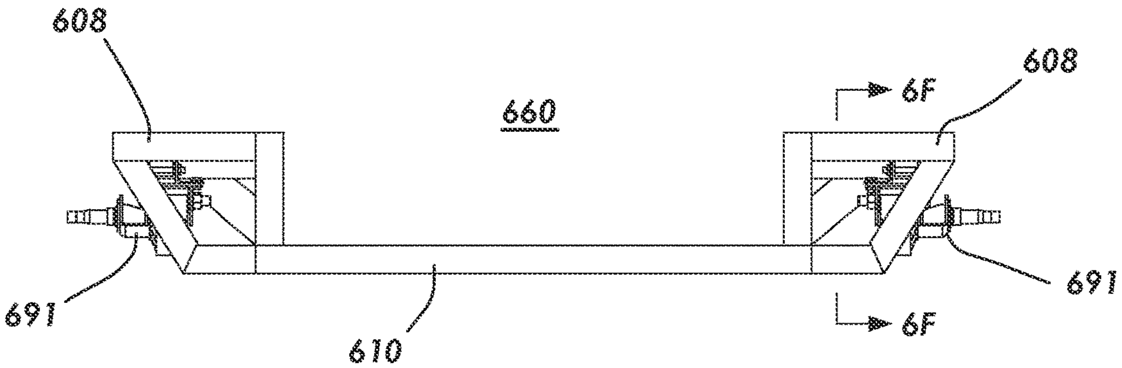
FIG. 6C is a rear view of the chassis including the rear driving system with the wheels removed of the cargo loader, in accordance with an embodiment.
Figure 6D:
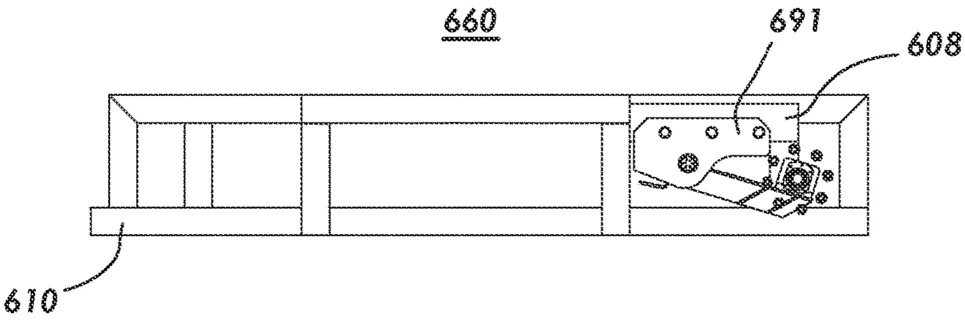
FIG. 6D is a side view of the chassis including the rear driving system with the wheels removed of the cargo loader, in accordance with an embodiment.
Figure 6E:
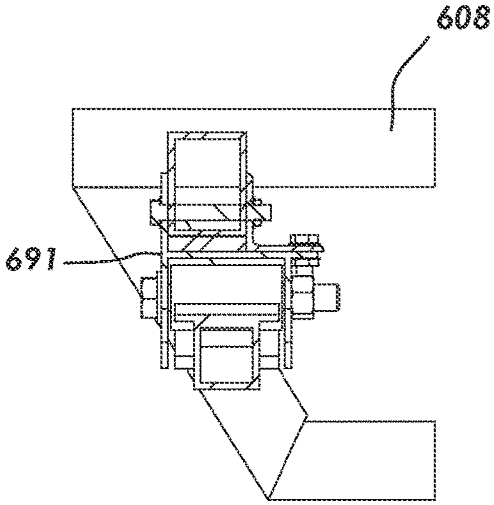
FIG. 6E is a side view of a suspension bracket of the rear driving system, in accordance with an embodiment.
Figure 6F:
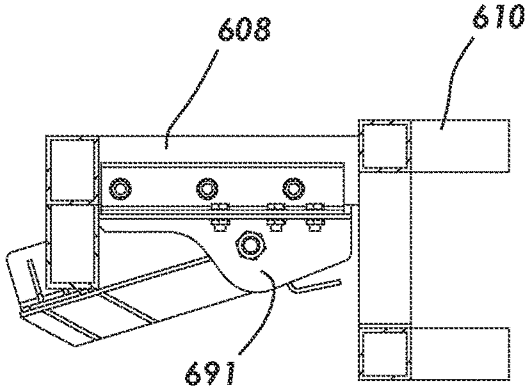
FIG. 6F is another side view of the suspension bracket of the rear driving system, in accordance with an embodiment.

FIGS. 6A-6F illustrate a front driving system of the low-profile, low-weight cargo loader, according to various embodiments of the subject application. In particular, FIG. 6A is a perspective view of the chassis including the rear driving system of the cargo loader, in accordance with an embodiment. FIG. 6B is a top view of the chassis including the rear driving system with the wheels removed of the cargo loader, in accordance with an embodiment. FIG. 6C is a rear view of the chassis including the rear driving system with the wheels removed of the cargo loader, in accordance with an embodiment. FIG. 6D is a side view of the chassis including the rear driving system with the wheels removed of the cargo loader, in accordance with an embodiment. FIG. 6E is a side view of a suspension bracket of the rear driving system, in accordance with an embodiment. FIG. 6F is another side view of the suspension bracket of the rear driving system, in accordance with an embodiment.

As shown in FIGS. 6A-6F, the chassis 610 includes the rear driving system 660. As shown in FIG. 6A, the chassis 610 includes a pair of cutouts 604 in the rear of the frame member to receive the pair of rear wheels 670. As shown in FIGS. 6A-6F, the suspension brackets 691 are bolted to the frame of the connecting fenders 608 formed in cutouts 604 on opposite external sides of the chassis 610 to connect the pair of rear wheels 670 to the chassis 610.

Figure 7A:
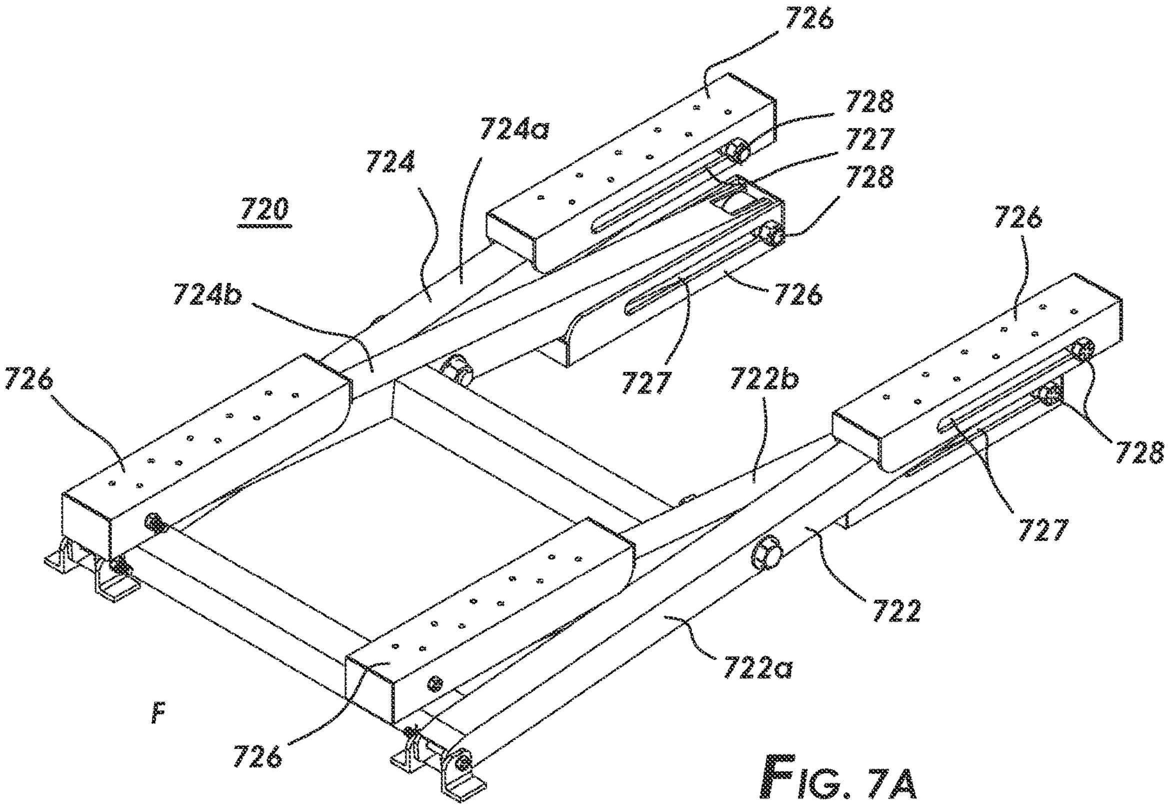
FIG. 7A is a perspective view of a scissor lift of the cargo loader in a seated position, in accordance with an embodiment.
Figure 7B:
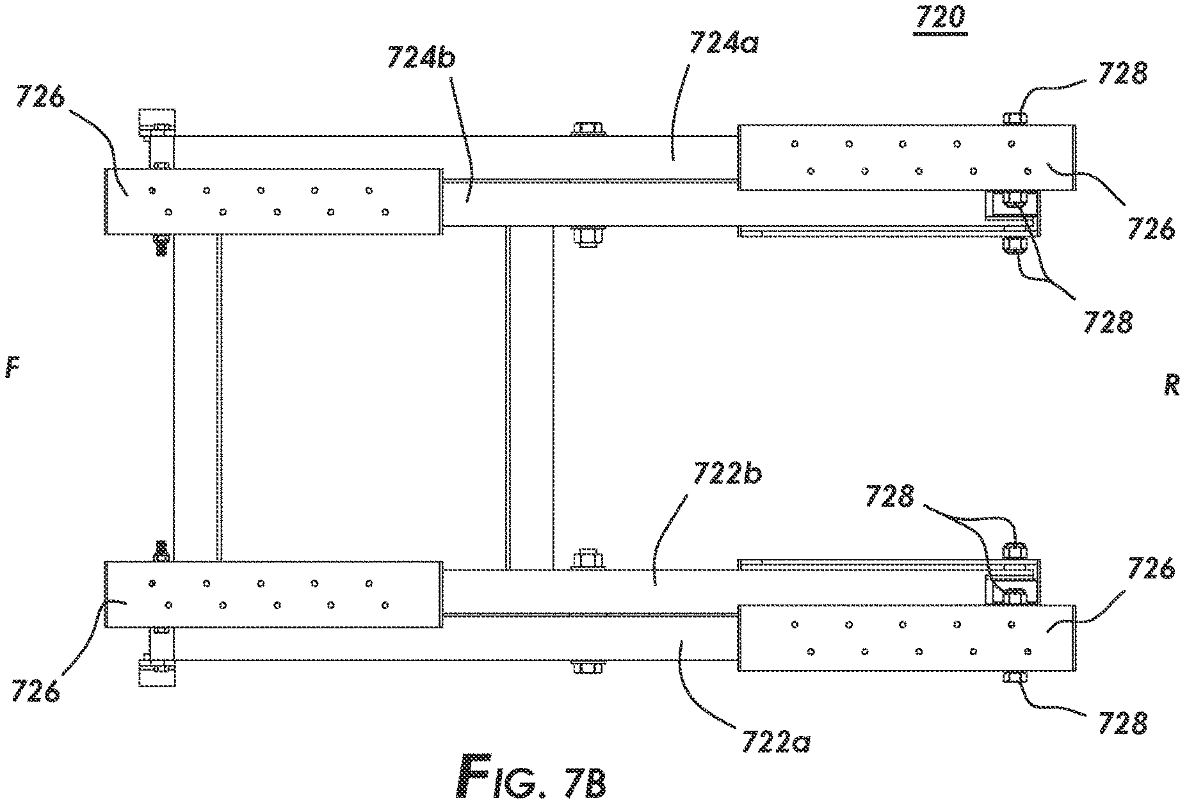
FIG. 7B is a top view of the scissor lift of the cargo loader in a seated position, in accordance with an embodiment.
Figure 7C:
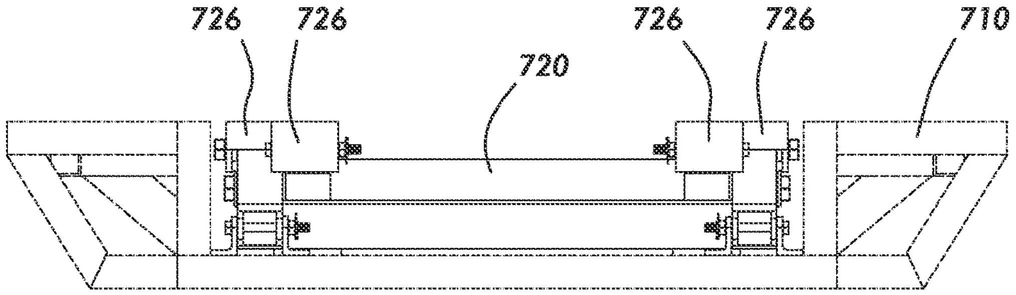
FIG. 7C is a front view of the scissor lift, in a seated position and engaged in the chassis of the cargo loader, in accordance with an embodiment.
Figure 7D:
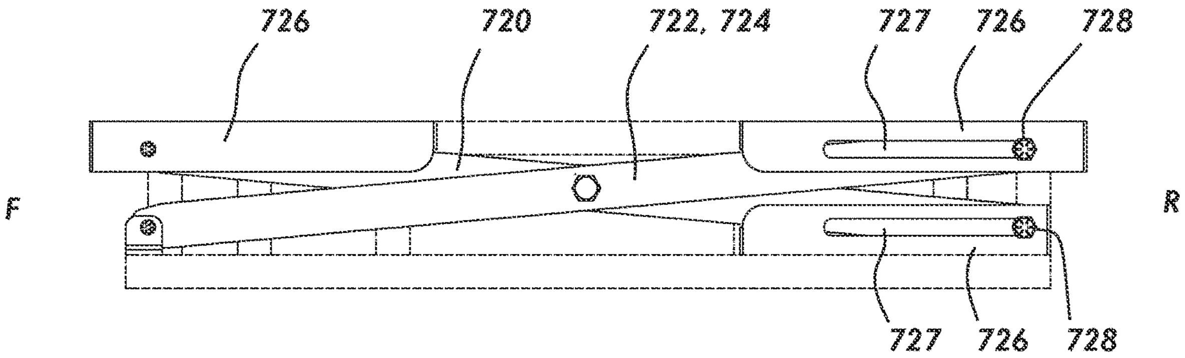
FIG. 7D is a side view of the scissor lift, in a seated position and engaged in the chassis of the cargo loader, in accordance with an embodiment.
Figure 7E:
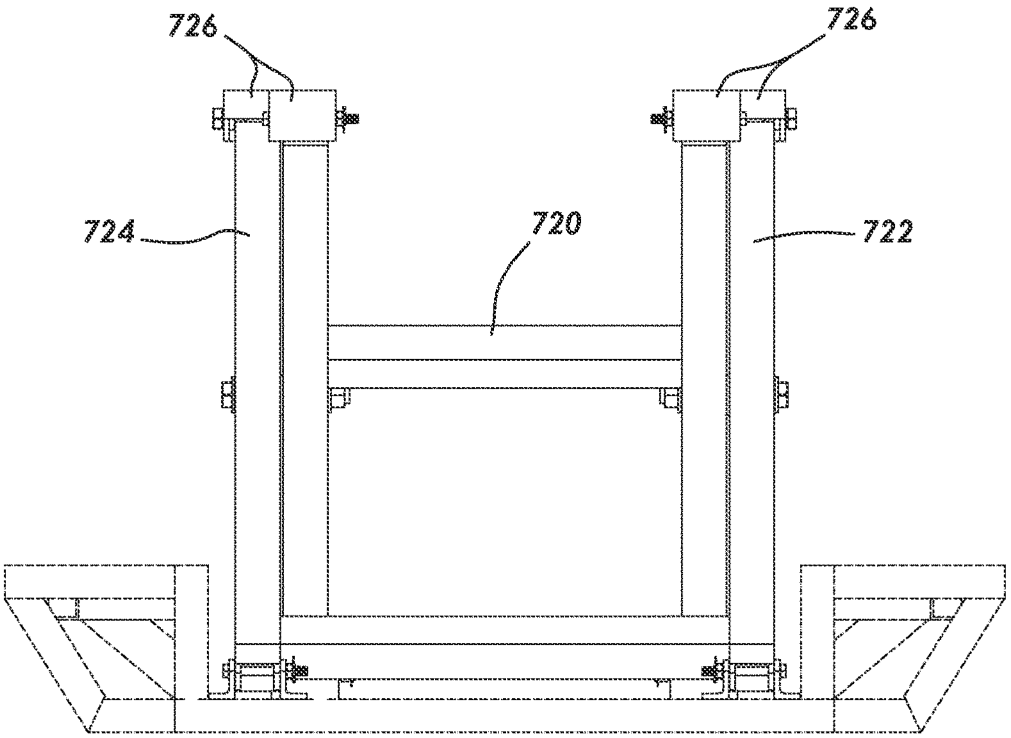
FIG. 7E is a front view of the scissor lift, in a lifted position and engaged in the chassis of the cargo loader, in accordance with an embodiment.
Figure 7F:
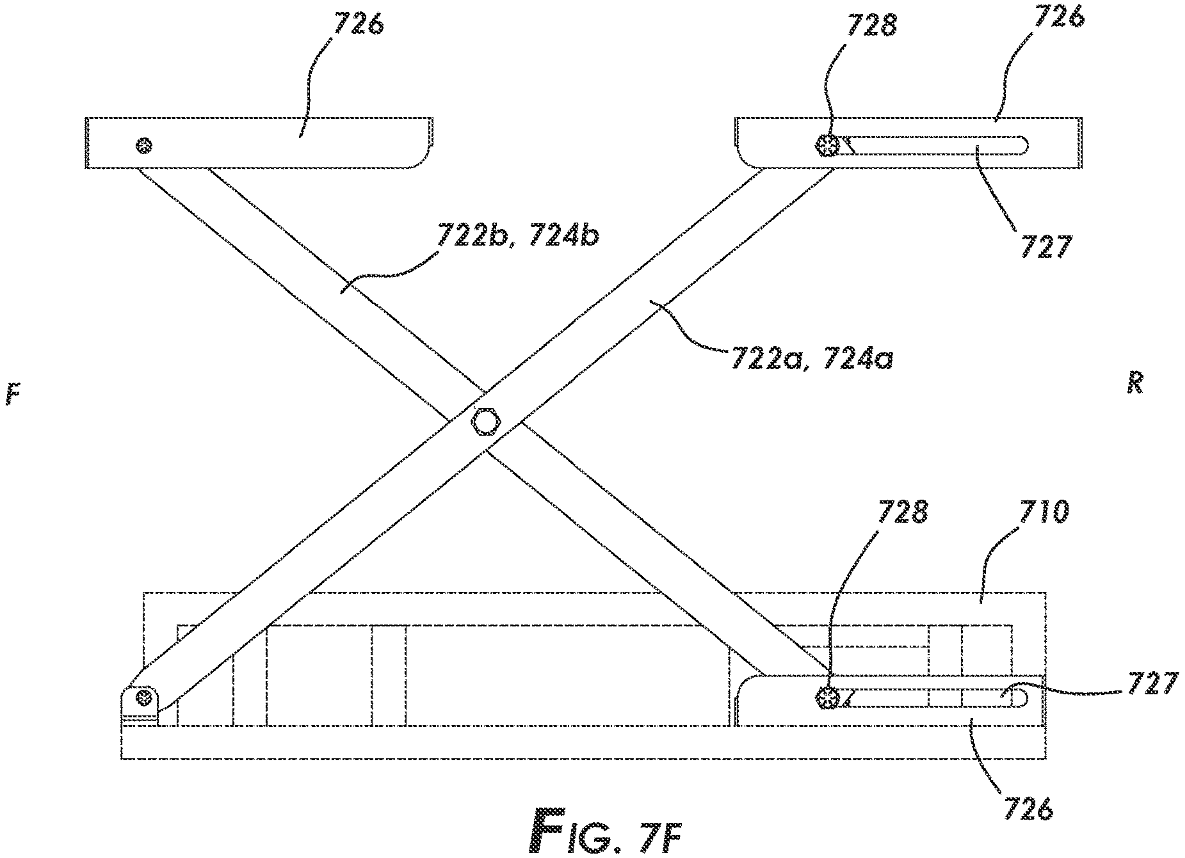
FIG. 7F is a side view of the scissor lift, in a lifted position and engaged in the chassis of the cargo loader, in accordance with an embodiment.

FIGS. 7A-7F illustrate a scissor lift of the low-profile, low-weight cargo loader, according to various embodiments of the subject application. In particular, FIG. 7A is a perspective view of a scissor lift of the cargo loader in a seated position, in accordance with an embodiment. FIG. 7B is a top view of the scissor lift of the cargo loader in a seated position, in accordance with an embodiment. FIG. 7C is a front view of the scissor lift, in a seated position and engaged in the chassis of the cargo loader, in accordance with an embodiment. FIG. 7D is a side view of the scissor lift, in a seated position and engaged in the chassis of the cargo loader, in accordance with an embodiment. FIG. 7E is a front view of the scissor lift, in a lifted position and engaged in the chassis of the cargo loader, in accordance with an embodiment. FIG. 7F is a side view of the scissor lift, in a lifted position and engaged in the chassis of the cargo loader, in accordance with an embodiment.

As shown in FIGS. 7A-7F, the scissor lift 720 includes two crossed lever arms 722, 724 disposed on opposite sides of the chassis 710, each arm 722, 724 having two crossed and pivotally interconnected arms **722*a*, 722*b* and 724*a*, 724*b*, respectively. Each of the interconnected arms 722*a*, 722*b* and 724*a*, 724*b* are pivotally connected at distal ends to the chassis 710 and the platform, using fasteners. As further shown in FIGS. 7A-7F, each of the crossed lever arms 722, 724 includes a plurality of support plates 726. According to an embodiment, the scissor lift 720 includes a pair of support plates 726 affixed to a top surface of the inner-positioned interconnected arms 722*b*, 724*b* at a front (F) position of the scissor lift 720. The scissor lift 720 further includes a pair of support plates 726 affixed to a bottom surface of the inner-positioned interconnected arms 722*b*, 724*b* and a pair of support plates 726 affixed to a top surface of the outer-positioned interconnected arms 722*a*, 722B at a rear (R) position of the scissor lift 720. Each of the support plates 726 in the rear (R) of the scissor lift 720 includes a cutout 727 to slidingly engage a bolt 728 in a longitudinal direction to facilitate the movement of the scissor lift 720 between the seated position (FIGS. 7A-7D) and the lifted position (FIGS. 7E-7F). In the seated position, each bolt 728 sits in a first position at a first distal end of the cutout 727 of the support plate 726 near the rear (R) of the scissor lift 720. In the lifted position, each bolt 728 sits in a second position at a second distal end of the cutout 727 of the support plate 726 toward the front (F) of the scissor lift 720**.

Figure 8A:
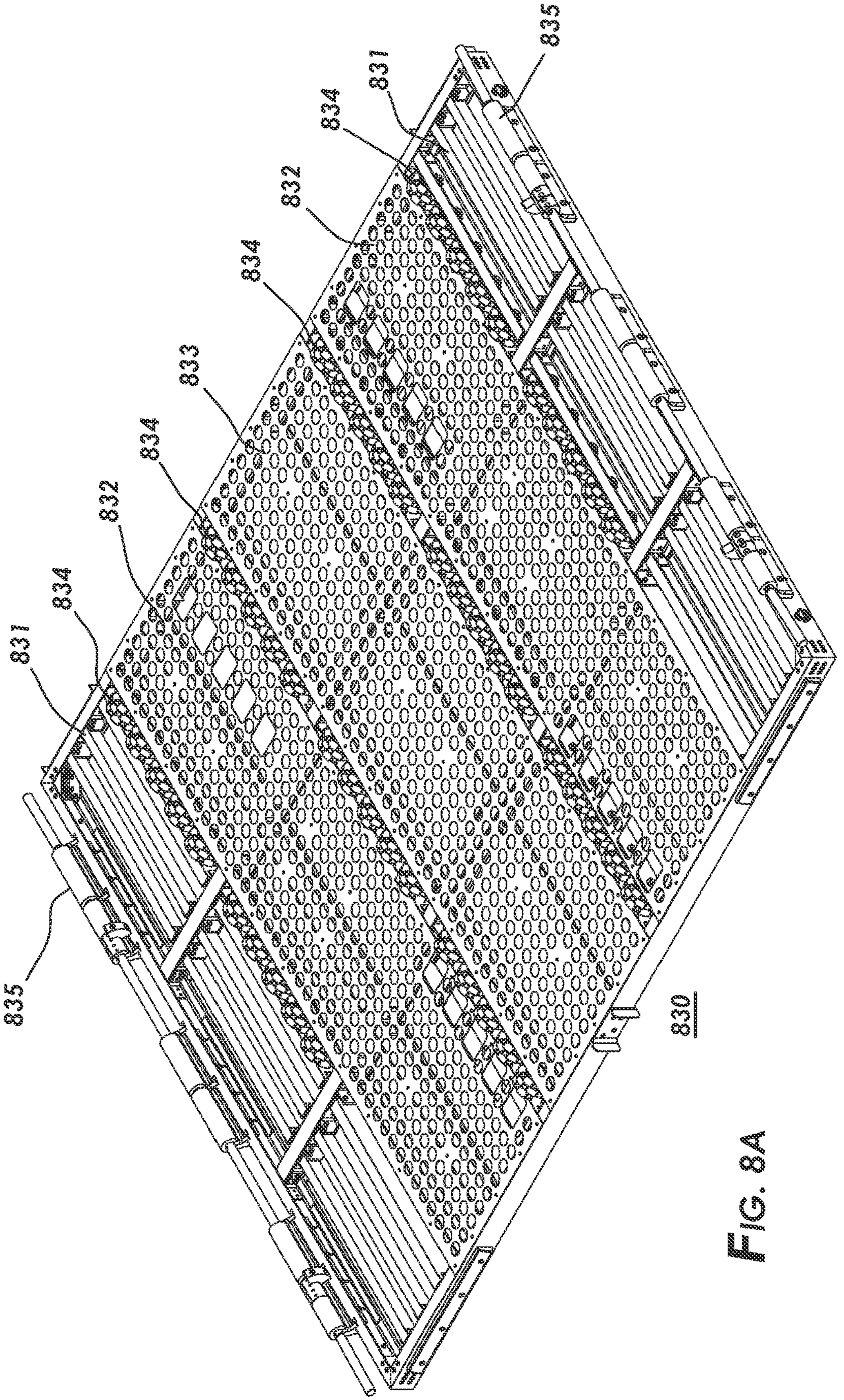
FIG. 8A is a perspective view of the platform of the cargo loader, in accordance with an embodiment.
Figure 8B:
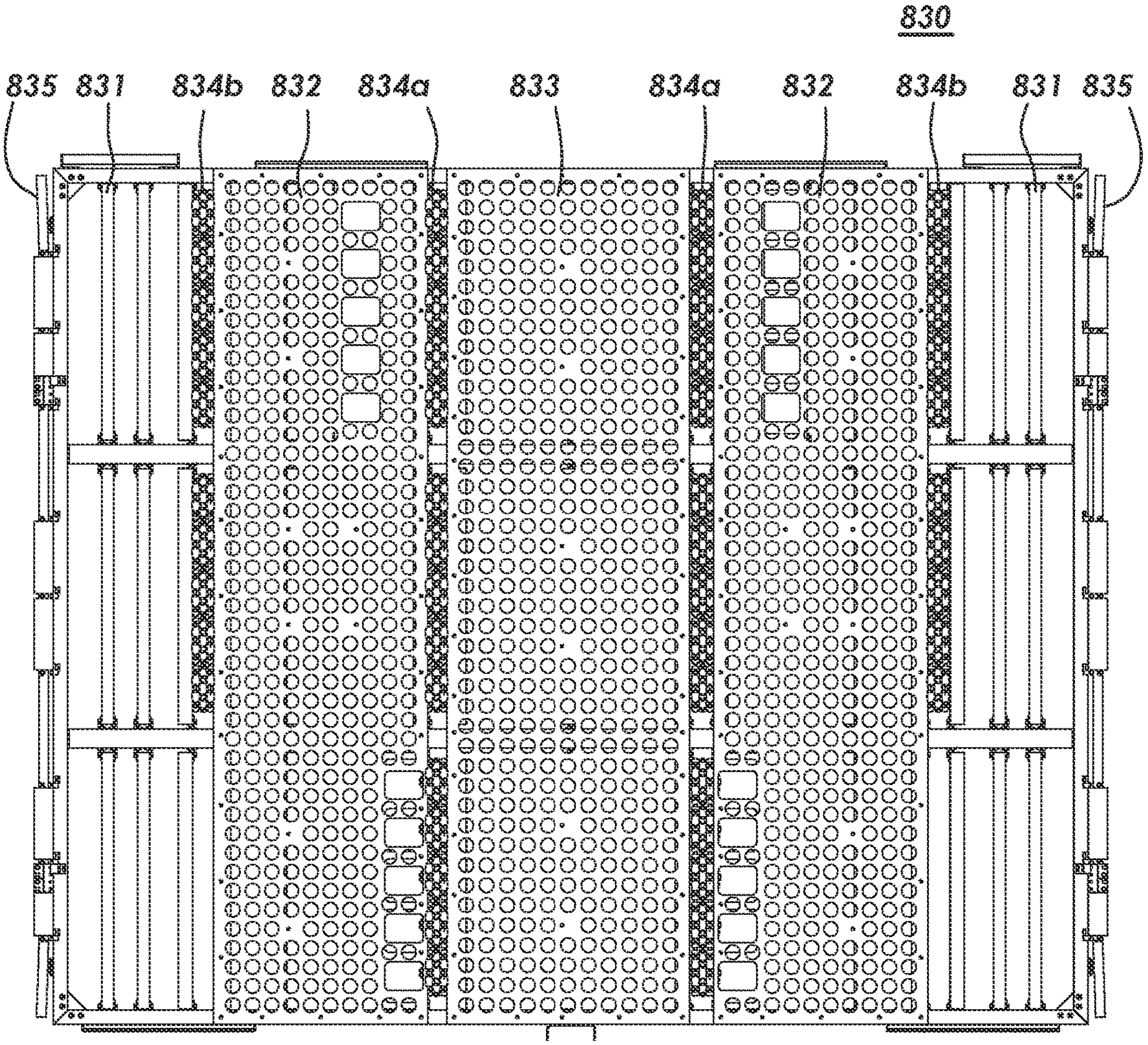
FIG. 8B is a top view of the platform of the cargo loader, in accordance with an embodiment.
Figure 8C:
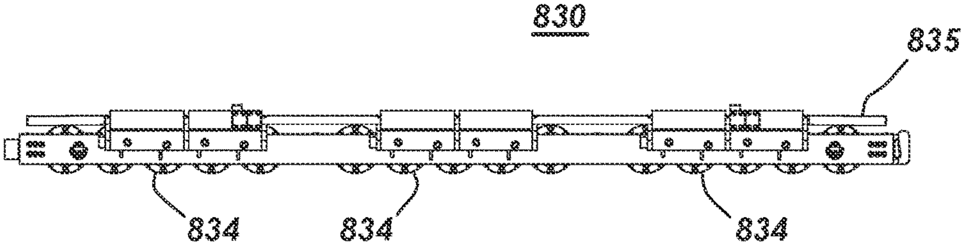
FIG. 8C is a side view of the platform of the cargo loader, in accordance with an embodiment.

FIGS. 8A-8C illustrate the platform of the low-profile, low-weight cargo loader, according to various embodiments of the subject application. In particular, FIG. 8A is a perspective view of the platform of the cargo loader, in accordance with an embodiment. FIG. 8B is a top view of the platform of the cargo loader, in accordance with an embodiment. FIG. 8C is a side view of the platform of the cargo loader, in accordance with an embodiment.

As shown in FIGS. 8A-8C, the platform 830 is a rigid, rectangular, open frame member including a pair of outer platform plates 831, a pair of inner platform plates 832, a middle platform plate 833, a set of rollers 834, and a pair of removable guide rails 835. The platform 830 has a width of approximately 110 inches and a length of approximately 89.5 inches, enabling it to carry an HCU-6/E or an 463L Master Pallet, or other standardized pallet for transporting military or commercial air cargo.

As further shown in FIGS. 8A and 8B, each of the outer platform plates 831 has a width correlating to a width of the pair of front wheels 150 and a width of the pair of rear wheels 170 of a stacked, low-profile, low-weight cargo loader, such that the front wheels 150 and the rear wheels 170 roll along a top surface of the pair of outer platform plates 831. The set of rollers 834 enable a pallet to roll on and off the platform 830. The guide rails 835 align the pallet as it rolls on and off the platform 830. According to an embodiment, the platform 830 includes a plurality of sets of rollers 834 to assist with rolling the cargo pallet on and off the platform 830. As shown in FIGS. 8A-8C, an embodiment of the platform 830 includes four (4) sets of rollers. According to an embodiment, an inner pair of rollers 834*a* extends approximately the full length of the platform 830, while an outer pair of rollers 834*b* extends a length of the platform 830 shorter than the length of the inner rollers 834*a*.

Figure 9A:
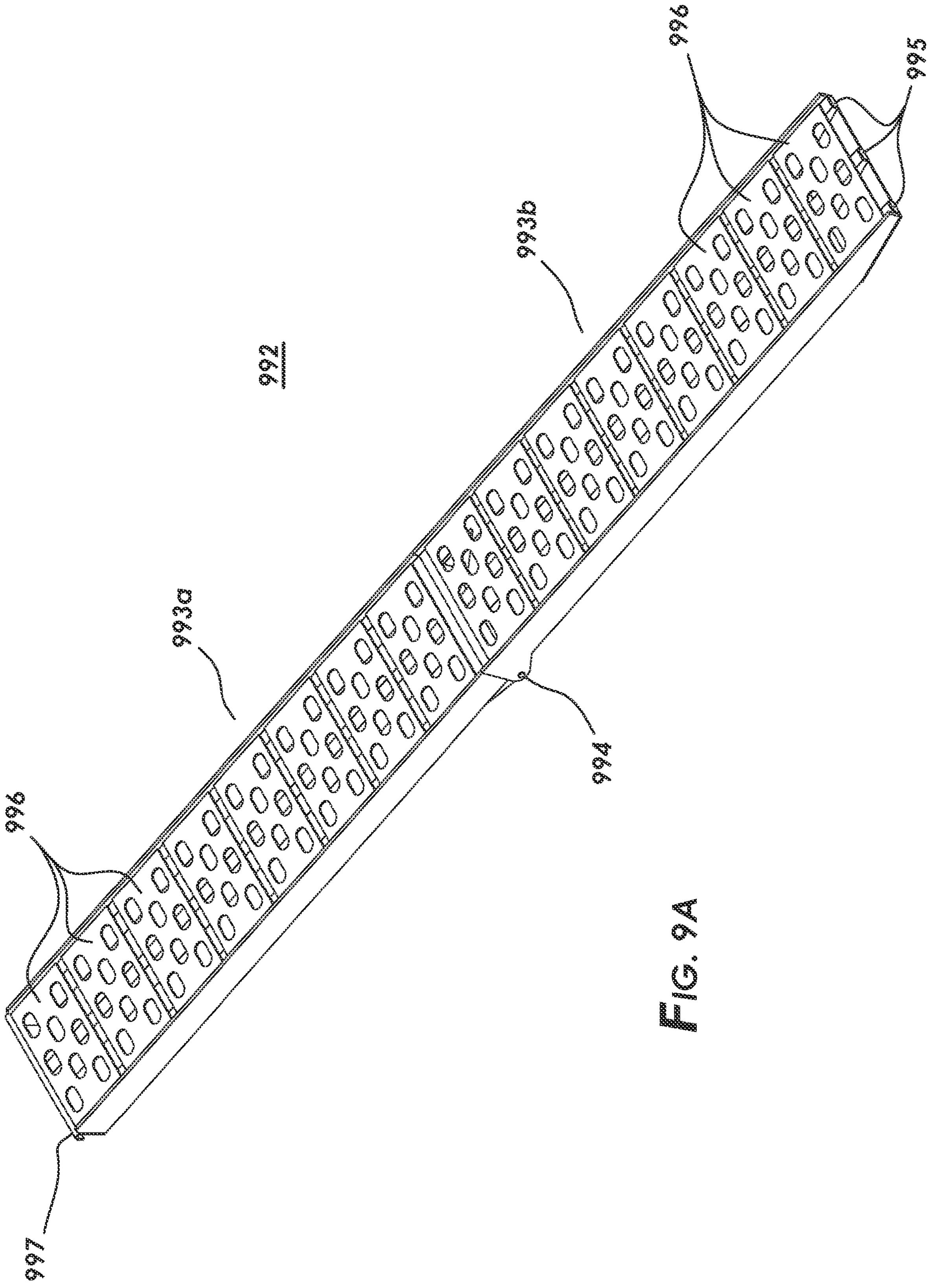
FIG. 9A is a perspective view of a ramp for the cargo loader, in accordance with an embodiment.
Figure 9B:
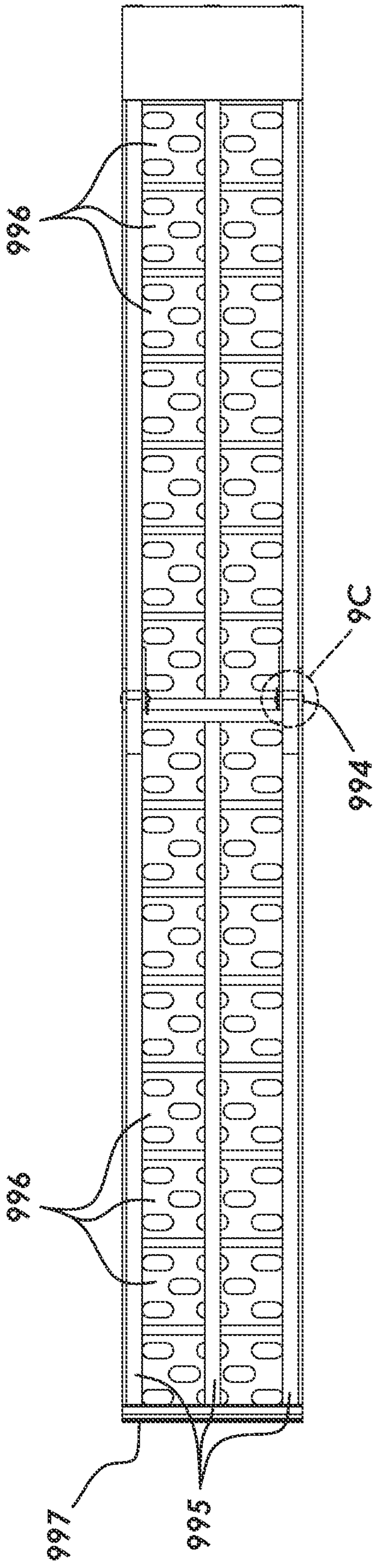
FIG. 9B is a bottom view of the ramp for the cargo loader, in accordance with an embodiment.
Figure 9C:
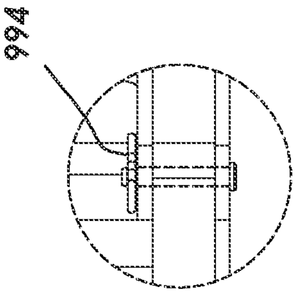
FIG. 9C is a perspective view of a hinge and pin of the ramp for the cargo loader, in accordance with an embodiment.

FIGS. 9A-9C illustrate the ramp used with the low-profile, low-weight cargo loader, according to various embodiments of the subject application. In particular, FIG. 9A is a perspective view of a ramp for the cargo loader, in accordance with an embodiment. FIG. 9B is a bottom view of the ramp for the cargo loader, in accordance with an embodiment. FIG. 9C is a perspective of a hinge and pin of the ramp for the cargo loader, in accordance with an embodiment.

As shown in FIGS. 9A-9C, the low-profile, low-weight cargo loader incorporates the use of a pair of ramps 992 to facilitate the furling (i.e. stacking) and unfurling (i.e., unstacking) of a pair of low-profile, low-weight cargo loaders, so that a pair of low-profile, low-weight cargo loaders 100 can be stacked on top of one another and stowed within the cargo hold of a cargo aircraft. According to an embodiment, each ramp, as illustrated in FIGS. 9A-9C, includes a top portion 993*a* and a bottom portion 993*b*, hingedly connected by a pin 994, so that the ramp 992 can be folded and stowed when not in use. The ramp 992 further includes a plurality of rails 995, three (3) rails according to one embodiment, extending the length of the ramp 992 from one distal end to the other distal end to provide support for a plurality of rigid, rectangular, open frame plates 996 extending the length of the ramp 992 from one distal end to the other distal end to provide a surface for the front wheels 150 and the rear wheels 170 of a low-profile, low-weight cargo loader 100, as it rolls up the pair of ramps 992 for furling in to and unfurling out of a stacked orientation with another low-profile, low-weight cargo loader 100. Each of the ramps 992 includes a connector 997 to connect the ramps 992 to the rear (R) of the low-profile, low-weight cargo loader 100.

Figure 10A:
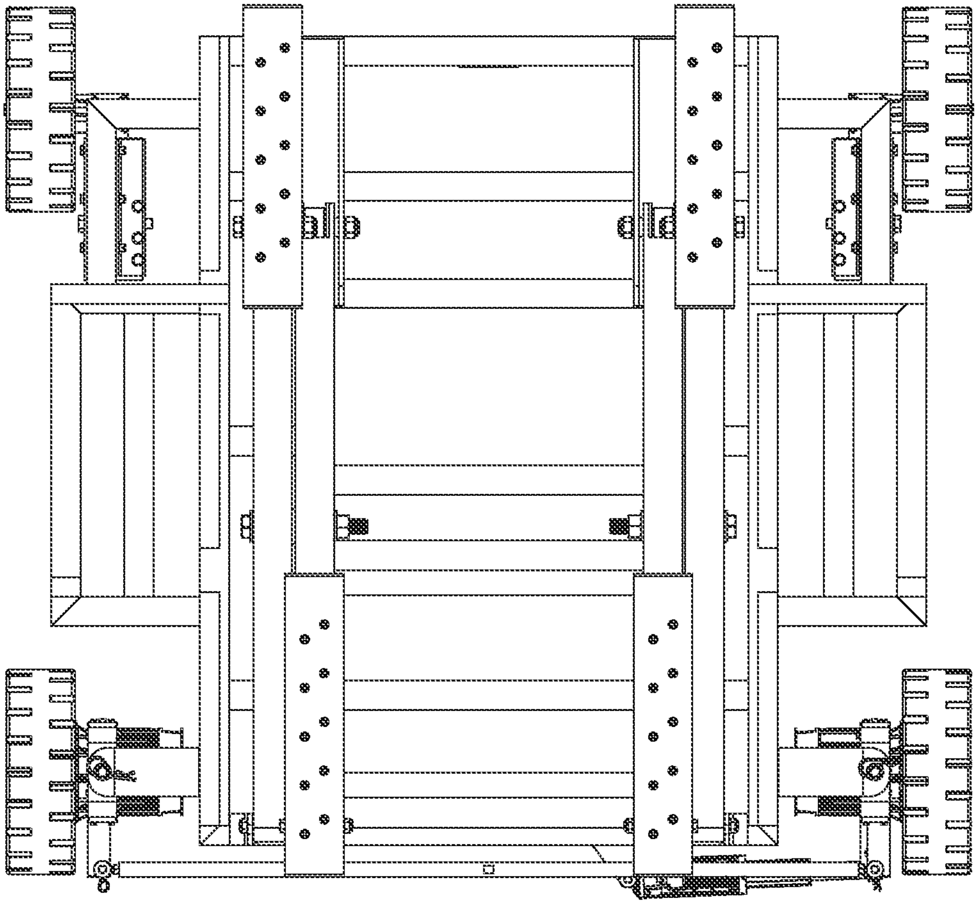
FIG. 10A is a top view of a single low-profile, low-weight cargo loader, in accordance with an embodiment.

FIG. 10A is a top view of a single low-profile, low-weight cargo loader, in accordance with an embodiment. The details of the single low-profile, low-weight cargo loader have been described in detail using FIGS. 1A-1E, 2A-2B, 3A-3C, 4, 5, 6A-6F, 7A-7F, and 8A-8C.

Figure 10B:
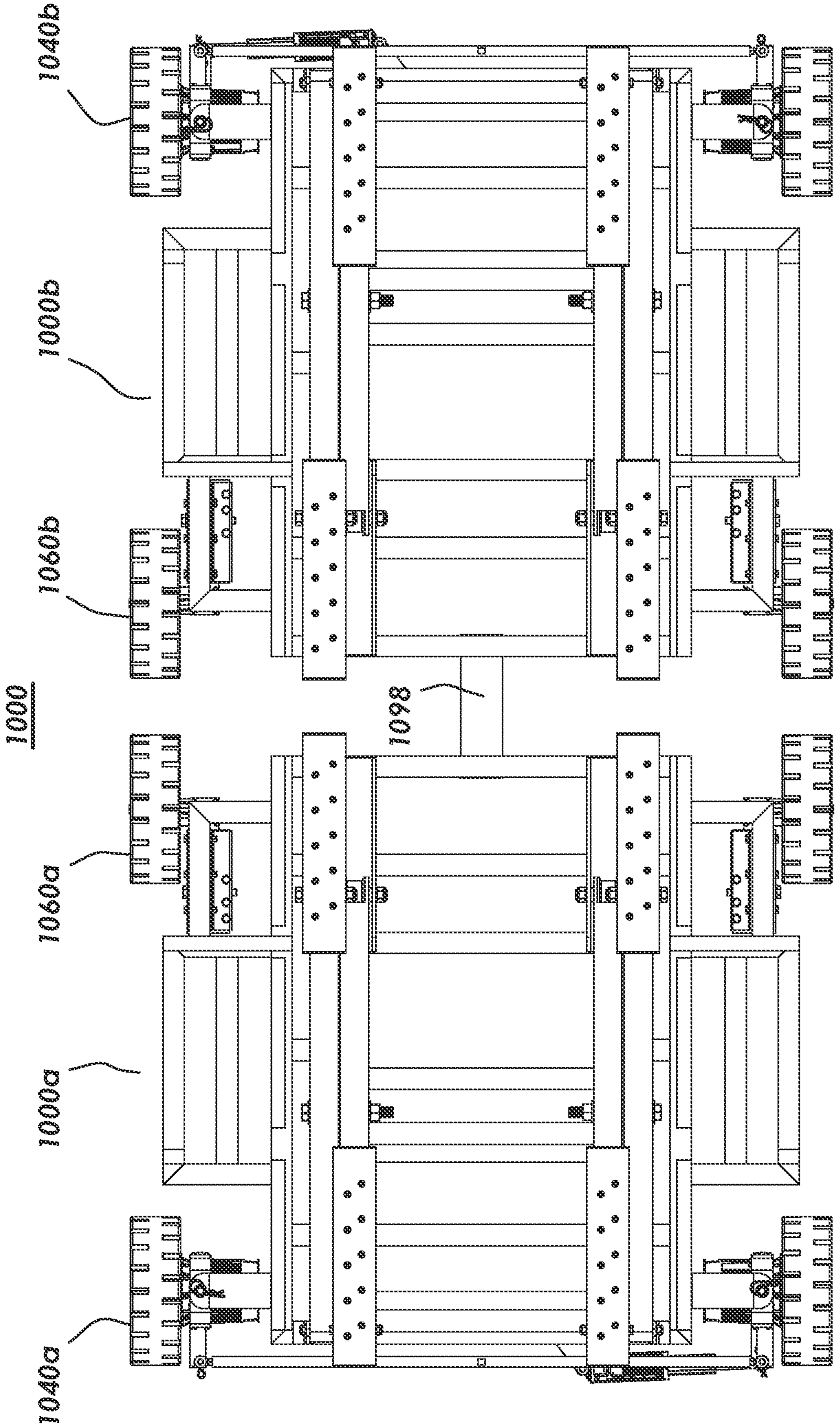
FIG. 10B is a top view of a tandem pair of low-profile, low-weight cargo loaders, in accordance with an embodiment.

FIG. 10B is a top view of a tandem pair of low-profile, low-weight cargo loaders, in accordance with an embodiment. Although a single low-profile, low-weight cargo loader 900 can be used for loading and unloading cargo on and off the cargo handling system of the aircraft, it is a preferred embodiment to provide a tandem pair of low-profile, low-weight cargo loaders 1000 that operate in concert to enable the loading and unloading of cargo requiring the length and load capacity of two cargo loaders. Various embodiments provide the tandem pair of low-profile, low-weight cargo loaders 1000 which are stackable, enabling transport of both of the low-profile, low-weight cargo loaders 1000 on a single cargo aircraft, thereby minimizing the need for multiple cargo aircraft.

According to an embodiment, the tandem pair of low-profile, low-weight cargo loaders 1000 includes a first low-profile, low-weight cargo loader 1000*a* and a second low-profile, low-weight cargo loader 1000*b*. The first low-profile, low-weight cargo loader 1000*a* and the second low-profile, low-weight cargo loader 1000*b* are mechanically connected to one another using a non-pivot-type hitch 1098. Each cargo loader 1000*a*, 1000*b* includes its own set of components, as described above in FIGS. 1A-1E, 2A-2B, 3A-3C, 4, 5, 6A-6F, 7A-7F, and 8A-8C, and thus can be independently driven, when disconnected, or driven together, when connected by the non-pivot-type hitch 1098. When connected, the first low-profile, low-weight cargo loader 1000*a* is positioned in an opposing orientation/direction with that of the second low-profile, low-weight cargo loader 1000*b*, such that the front driving system 1040*a* of the first low-profile, low-weight cargo loader 1000*a* and the front driving system 1040*b* of the second low-profile, low-weight cargo loader 1000*b* are positioned on opposing ends of the tandem low-profile, low-weight cargo loader 1000, as shown in FIG. 10B. The rear driving system 1060*a* of the first low-profile, low-weight cargo loader 1000*a* and the rear driving system 1060*b* of the second low-profile, low-weight cargo loader 1000*b* are positioned adjacent to one another on the tandem low-profile, low-weight cargo loader 1000, as shown in FIG. 10B. Thus, the tandem low-profile, low-weight cargo loader 1000 becomes a 4-wheel drive vehicle with the pairs of driving wheels positioned on the opposing ends of the tandem low-profile, low-weight cargo loader 1000, as shown in FIG. 10B, thereby providing the tandem low-profile, low-weight cargo loader 1000 with a larger turning radius, when the opposing front driving systems 1040*a*, 1040*b* are turned in opposing directions (i.e, the front pair of wheels turn right, while the back pair of wheels turn left to produce a sharp right turn of the tandem low-profile, low-weight cargo loader 1000, and vice versa for a sharp left turn).

According to an embodiment, the scissor lifts of each respective low-profile, low-weight cargo loader 1000*a*, 1000*b* can be operated in unison, so that the two raised platforms can be leveled with one another to facilitate movement of a larger cargo onto both platforms of the loaders 1000*a*, 1000*b*. In operation, both cargo loaders 1000*a*, 1000*b* can then be moved as a single unit to deliver the cargo to its final destination.

Figure 11A:
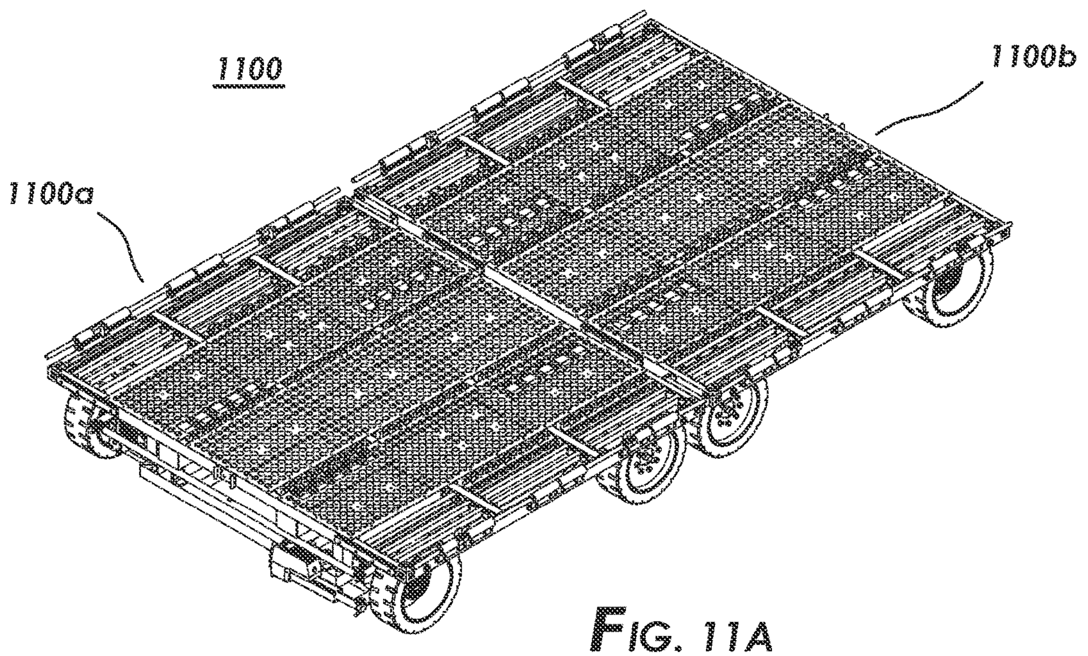
FIGS. 11A-11E illustrate a furling and an unfurling of the tandem pair of low-profile, low-weight cargo loaders, in accordance with an embodiment.
Figure 11B:
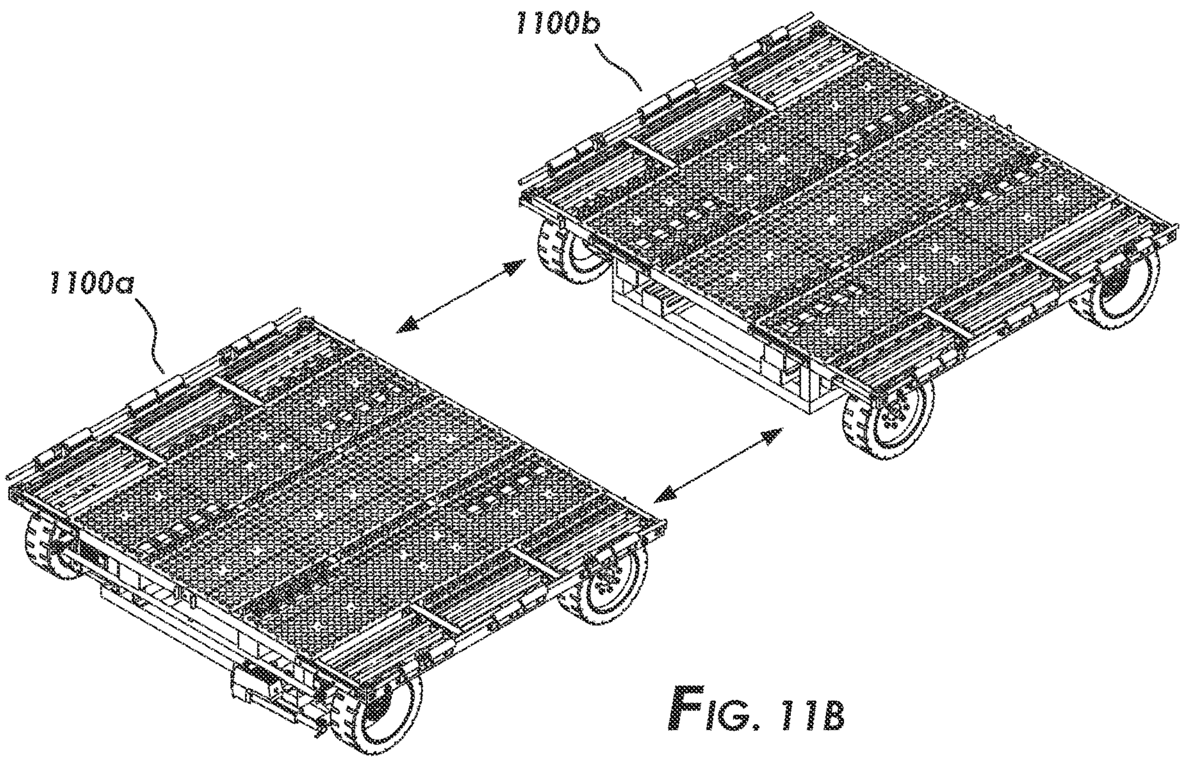
Figure 11C:
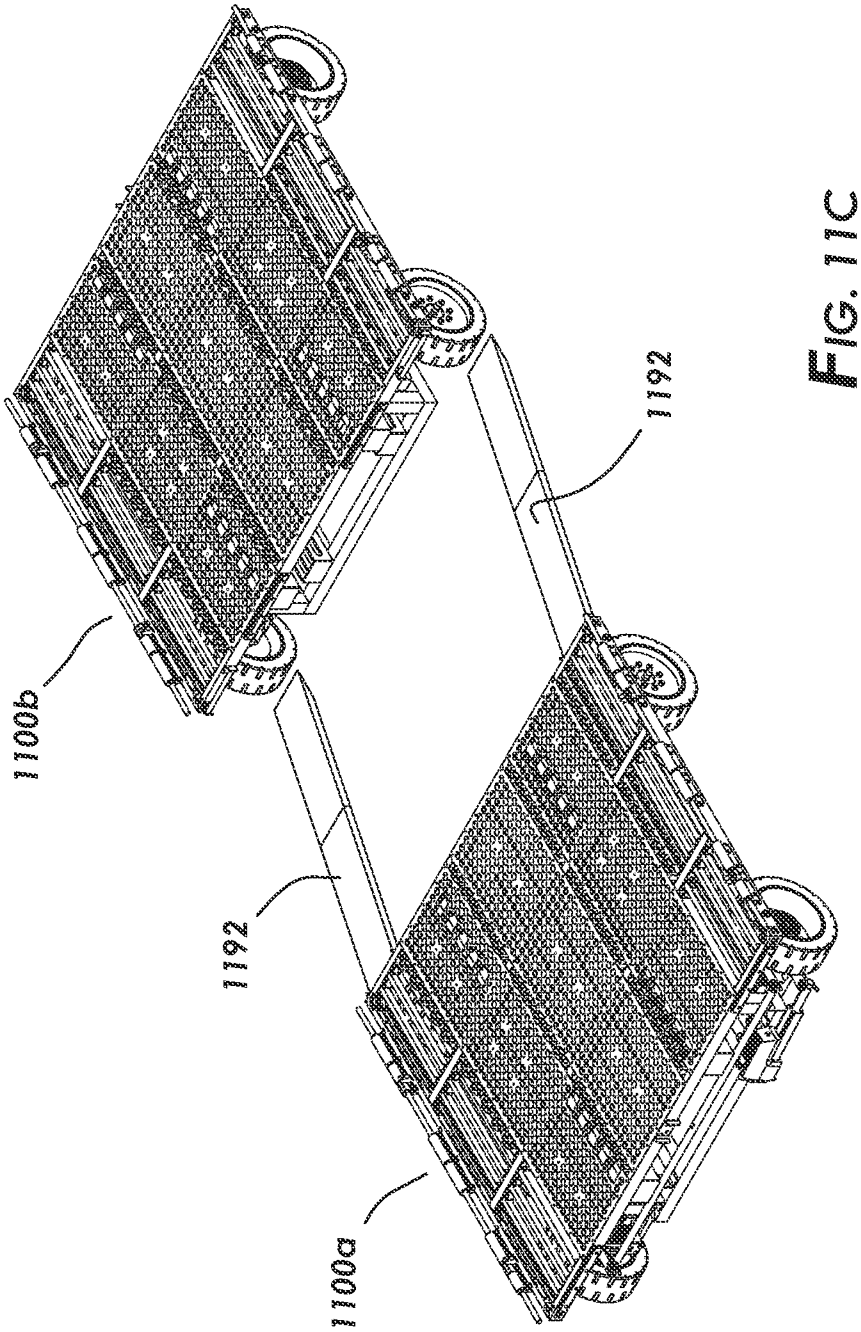
Figure 11D:
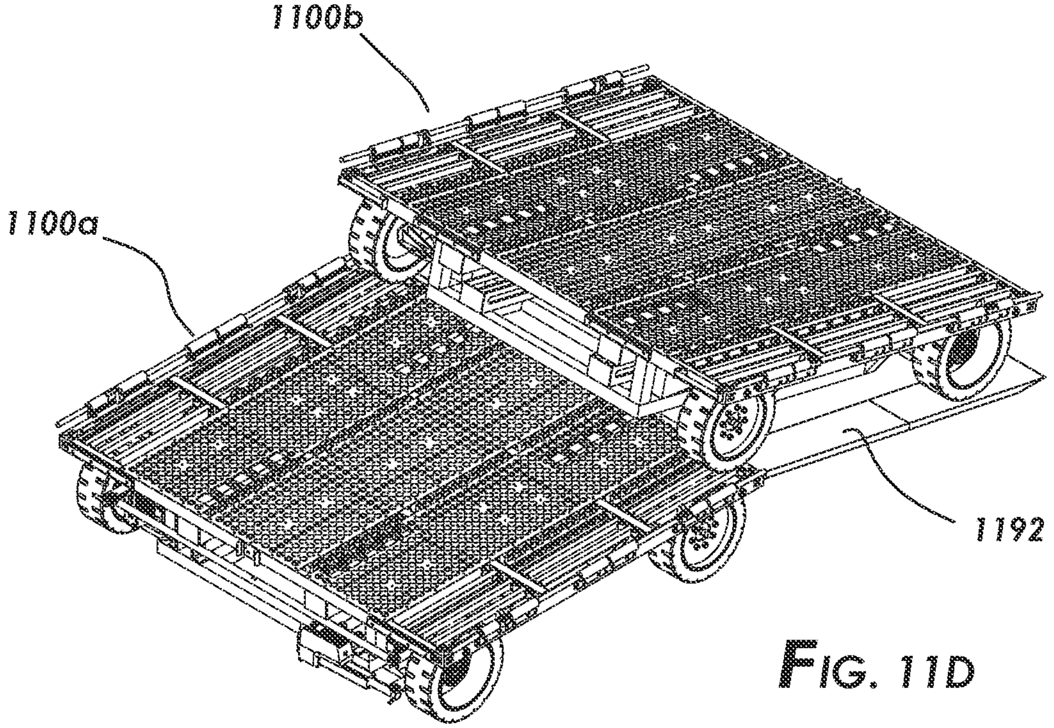
Figure 11E:
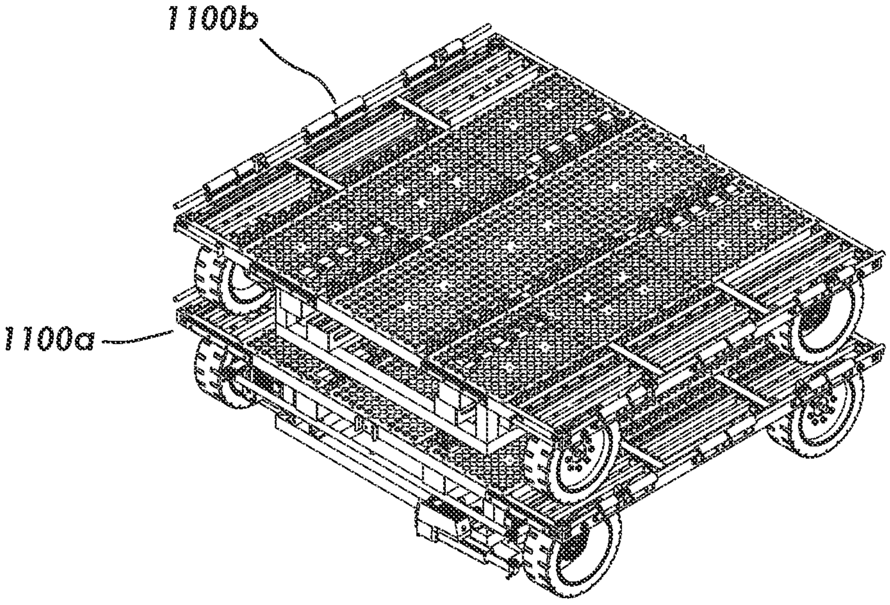

FIGS. 11A-11E illustrate a furling and an unfurling of the tandem pair of low-profile, low-weight cargo loaders, in accordance with an embodiment. FIG. 11A illustrates an attached tandem pair of low-profile, low-weight cargo loaders, FIG. 11B illustrates the detachment of the tandem pair of low-profile, low-weight cargo loaders, FIG. 11C illustrates the deployment of a pair of ramps in preparation for a furling of one low-profile, low-weight cargo loader on top of the other low-profile, low-weight cargo loader, FIG. 11D illustrates a movement of one low-profile, low-weight cargo loader onto a top surface of the other low-profile, low-weight cargo loader, and FIG. 11E illustrates a stacked pair of low-profile, low-weight cargo loaders.

FIG. 11A illustrates an attached tandem pair of low-profile, low-weight cargo loaders 1100, 1100*a*, 1100*b*. As shown in FIG. 11B, the tandem pair of low-profile, low-weight cargo loaders 1100*a*, 1100*b* are disconnected, and the second low-profile, low-weight cargo loader 1100*b* is driven apart from the first low-profile, low-weight cargo loader 1100*a*. As shown in FIG. 11C, the second low-profile, low-weight cargo loader 1100*b* is driven apart from the first low-profile, low-weight cargo loader 1100*a* a distance so that the pair of ramps 1192 can be attached to the rear (R) of the first low-profile, low-weight cargo loader 1100*a*. As shown in FIG. 11, the second low-profile, low-weight cargo loader 1100*b* is driven up the ramps 1192, guided by the guide rails, onto the first low-profile, low-weight cargo loader 1100*a*, so that the wheels of the second low-profile, low-weight cargo loader 1100*b* align with the outer platform plates on the top surface of the platform of the first low-profile, low-weight cargo loader 1100*a*, thereby evenly distributing the weight of the second low-profile, low-weight cargo loader 1100*b* on top of the first low-profile, low-weight cargo loader 1100*a*, as shown in FIG. 11E. The stacked low-profile, low-weight cargo loaders are now ready to be loaded into the cargo hold of the cargo aircraft.

According to an embodiment, when the second low-profile, low-weight cargo loader 1100*b* is disconnected from the first low-profile, low-weight cargo loader 1100*a*, functionality of the scissor lifts of both the first low-profile, low-weight cargo loader 1100*a* and the second low-profile, low-weight cargo loader 1100*b* is disabled, allowing only the driving movement of the second low-profile, low-weight cargo loader 1100*b* onto the first low-profile, low-weight cargo loader 1100*a*, and subsequently the driving movement of the first low-profile, low-weight cargo loader 1100*a*.

Figure 12:
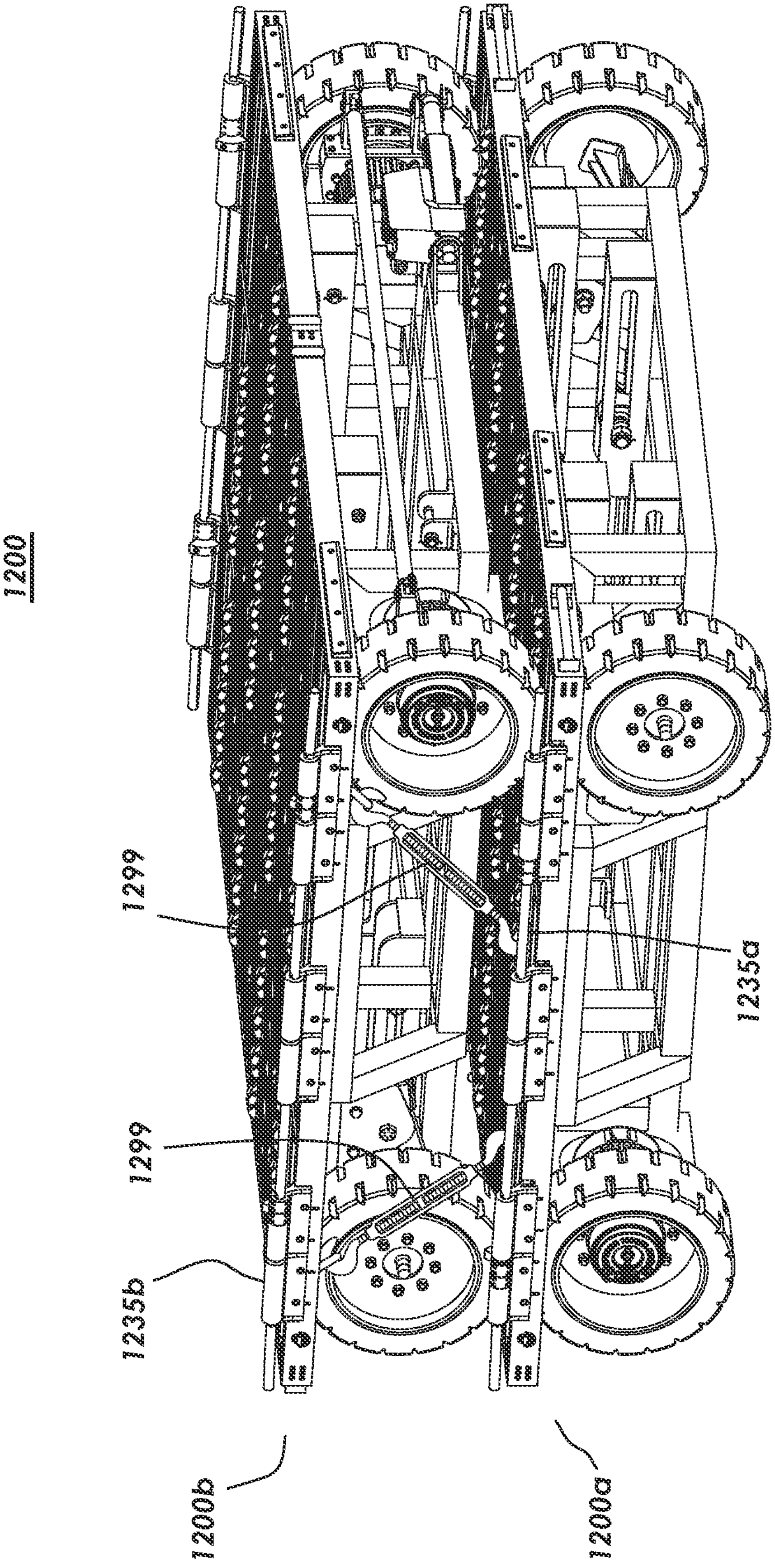
FIG. 12 is a perspective view of the stacked low-profile, low-weight cargo loaders, in accordance with an embodiment.

FIG. 12 is a perspective view of the stacked low-profile, low-weight cargo loaders, in accordance with an embodiment. As shown in FIG. 12, the stacked low-profile, low-weight cargo loaders 1200 are secured to one another using a plurality of tie-down ratcheting turnbuckles 1299. According to an embodiment, the stacked low-profile, low-weight cargo loaders 1200 are secured to one another by securing a pair of tie-down ratcheting turnbuckles 1299 to two points along the guide rail 1235*a* of the first low-profile, low-weight cargo loader 1200*a* and two points along the guide rail 1235*b* of the second low-profile, low-weight cargo loader 1200*b* on both sides of stacked low-profile, low-weight cargo loaders 1200.

Although the preferred embodiment has been described including a tandem pair (e.g., two) of low-profile, low-weight cargo loaders, other embodiments envision three or more low-profile, low-weight cargo loaders positioned in tandem, capable of being stacked on one another.

According to an embodiment, when unfurled from a stacked orientation, each low-profile, low-weight cargo loader can be independently deployed to a location to either unload cargo transported by the cargo aircraft or retrieve cargo for loading onto the cargo aircraft. Upon completing these tasks, the individual low-profile, low-weight cargo loaders can then be furled into a stacked orientation and stowed on the cargo aircraft (i.e., effectively functioning as a fully automated "swarm" of cargo loaders). The fully automated "swarm" of cargo loaders is controlled by an operator using a wired or wireless controller (i.e., using a smart phone, table, or laptop) to furl, unfurl, and deploy each cargo loader for its respective task.

We claim:

1. A low-profile, low-weight cargo loader, comprising:

a pair of cargo loaders comprising a first cargo loader arranged in tandem with a second cargo loader in a first orientation, wherein each of the first cargo loader and the second cargo loader comprises a chassis, a scissor lift, a platform, a front driving system, and a rear driving system, and wherein the second cargo loader is configured to be stacked on the first cargo loader in a second orientation wherein, in the first orientation, the first cargo loader is arranged in an opposing orientation/direction with that of the second cargo loader, such that the front driving system of the first cargo loader and the front driving system of the second cargo loader are positioned on opposing ends of the tandem pair of cargo loaders.

2. The low-profile, low-weight cargo loader of claim 1, wherein each of the first cargo loader and the second cargo loader has a low-profile height of 24-25 inches.

3. The low-profile, low-weight cargo loader of claim 1, wherein each of the first cargo loader and the second cargo loader weighs 5,000 pounds and is capable of carrying a cargo load of 11,000 pounds.

4. The low-profile, low-weight cargo loader of claim 1, wherein the first cargo loader is connected in tandem with the second cargo loader in the first orientation using a non-pivot-type hitch.

5. The low-profile, low-weight cargo loader of claim 1, wherein, in the first orientation, the rear driving system of the first cargo loader and the rear driving system of the second cargo loader are positioned adjacent to one another on the tandem pair of cargo loaders.

6. The low-profile, low-weight cargo loader of claim 5, wherein the front driving system of the first cargo loader comprises a first pair of front wheels and the front driving system of the second cargo loader comprises a second pair of front wheels, wherein the rear driving system of the first cargo loader comprises a first pair of rear wheels and the rear driving system of the second cargo loader comprises a second pair of rear wheels, and wherein each of the front driving systems of the first and second cargo systems is configured to steer the first pair of front wheels and the second pair of front wheels in opposite directions to turn the low-profile, low-weight cargo loader.

7. The low-profile, low-weight cargo loader of claim 6, wherein the first pair of rear wheels and the second pair of rear wheels are non-steering, freely spinning wheels.

8. The low-profile, low-weight cargo loader of claim 6, wherein each of the rear driving systems of the first cargo loader and the second cargo loader further comprises a pair of suspension brackets, wherein the suspension brackets are configured to secure the pair of rear driving wheels to the chassis of the first cargo loader and the second cargo loader, respectively.

9. The low-profile, low-weight cargo loader of claim 1, wherein, in the first orientation, each of the scissor lifts of the first cargo loader and the second cargo loader are configured to lower and raise a respective platform either independently of one another or in unison, and wherein, when lowered or raised in unison, are configured to be leveled with one another to move cargo onto the platforms of the first and second cargo loaders, thereby moving as a single unit to deliver the cargo.

10. The low-profile, low-weight cargo loader of claim 1, wherein each platform comprises a set of rollers configured to roll in an X and Y direction so that cargo can be unloaded off and loaded on any side of the platform.

11. The low-profile, low-weight cargo loader of claim 1, wherein each platform comprises a pair of guide rails positioned on opposite sides of the platform, the pair of guide rails configured to secure a pallet to the platform and further configured to guide a set of wheels of the second cargo loader onto a top surface of the platform of the first cargo loader when the second cargo loader is stacked on the first cargo loader in the second orientation.

12. The low-profile, low-weight cargo loader of claim 1, wherein each chassis of the first cargo loader and the second cargo loader comprises a winged support configured to support a bottom surface of the platform of the first cargo loader and the second cargo loader and cargo carried on the platform of the first cargo loader and the second cargo loader.

13. The low-profile, low-weight cargo loader of claim 1, further comprising:

a pair of ramps configured to attach to the rear of the first cargo loader, wherein the second cargo loader is configured to roll up the pair of ramps to stack the second cargo loader on the first cargo loader.

14. The low-profile, low-weight cargo loader of claim 1, further comprising:

a plurality of tie-down ratcheting turnbuckles configured to secure the first cargo loader to the second cargo loader, in the second orientation.

15. A method for furling a pair of low-profile, low weight cargo loaders, comprising:

mechanically and electronically disconnecting the pair of low-profile, low weight cargo loaders arranged in tandem, wherein the pair of low-profile, low weight cargo loaders comprises a first cargo loader arranged in tandem with a second cargo loader in an unfurled orientation, wherein each of the first cargo loader and the second cargo loader comprises a chassis, a scissor lift, a platform, a front driving system, and a rear driving system;

driving, using the front driving system of the second cargo loader, the second cargo loader away from the first cargo loader and deploying a pair of ramps by connecting the pair of ramps to the rear of the first cargo loader;

driving, using the front driving system of the second cargo loader, the second cargo loader up the ramps onto the first cargo loader guided by guide rails arranged on opposite sides of the platform of the first cargo loader; and driving, using the front driving system of the first cargo loader, the first cargo loader and the furled second cargo loader onto a cargo aircraft.

* * * * *